US012795717B2

(12) United States Patent
Maamari et al.

(10) Patent No.: US 12,795,717 B2
(45) Date of Patent: Nov. 10, 2026

(54) METHOD AND APPARATUS FOR IDENTIFICATION OF REDCAP UES

(71) Applicant: Huawei Technologies Co., Ltd., Shenzhen (CN)

(72) Inventors: Diana Maamari, Palatine, IL (US); Brian Classon, Palatine, IL (US); Philippe Sartori, Naperville, IL (US); Vipul Desai, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 18/330,774

(22) Filed: Jun. 7, 2023

(65) Prior Publication Data

US 2024/0090018 A1 Mar. 14, 2024

Related U.S. Application Data

(63) Continuation of application No. PCT/US2021/062060, filed on Dec. 6, 2021.

(Continued)

(51) Int. Cl.

*H04W 74/00* (2009.01)
*H04W 28/02* (2009.01)

(Continued)

(52) U.S. Cl.

CPC ..... *H04W 74/002* (2013.01); *H04W 28/0215* (2013.01); *H04W 74/0833* (2013.01); *H04W 74/0836* (2024.01); *H04W 74/0838* (2024.01)

(58) Field of Classification Search

CPC ........... H04W 74/002; H04W 28/0215; H04W 74/0833; H04W 74/0838; H04W 74/0836
See application file for complete search history.

(56) References Cited

U.S. PATENT DOCUMENTS

2021/0195654 A1* 6/2021 Lei ........................ H04W 72/21
2021/0392699 A1* 12/2021 Park ...................... H04L 1/1864

(Continued)

FOREIGN PATENT DOCUMENTS

JP 2023549010 A 11/2023
WO 2022061507 A1 3/2022

OTHER PUBLICATIONS

ZTE, "Potential UE complexity reduction features", 3GPP TSG RAN WG1#102-3, R1-2005474, Aug. 17-28, 2020 (Year: 2020).*

(Continued)

*Primary Examiner* — Siming Liu
(74) *Attorney, Agent, or Firm* — Slater Matsil, LLP

(57) ABSTRACT

A user equipment (UE) may determine, based on a criterion, whether to indicate, to a gNB, that it is a reduced capability (RedCap) UE during or after a random access (RA) procedure, and indicate that it is the RedCap UE during or after the RA procedure according to a determination result. The RedCap UE has a reduced quantity of receive branches or a reduce bandwidth than a non-RedCap UE. The gNB may determine whether a first message received during the RA procedure indicates that the UE is the RedCap UE. When the first message indicates the UE as the RedCap UE, the gNB sends a second message to the UE during the RA procedure using a coverage recovery technique. When the first message does not indicate the UE as the RedCap UE, the gNB determines whether the UE is the RedCap UE after the RA procedure is completed.

19 Claims, 7 Drawing Sheets

Related U.S. Application Data

(60) Provisional application No. 63/250,751, filed on Sep. 30, 2021, provisional application No. 63/122,414, filed on Dec. 7, 2020.

(51) Int. Cl.

| | |
|---|---|
| ***H04W 74/0833*** | (2024.01) |
| *H04W 74/0836* | (2024.01) |
| *H04W 74/0838* | (2024.01) |

(56) References Cited

U.S. PATENT DOCUMENTS

| | | | | |
|---|---|---|---|---|
| 2022/0210806 | A1* | 6/2022 | Rastegardoost | H04L 5/0094 |
| 2023/0030240 | A1 | 2/2023 | Höglund et al. | |
| 2023/0065929 | A1* | 3/2023 | He | H04W 74/004 |

OTHER PUBLICATIONS

Ericsson, “Potential UE complexity reduction features for RedCap”, 3GPP TSG-RAN WG1 Meeting #103-e, R1-2008837, Oct. 26-Nov. 13, 2020, 62 pages, Online.
Moderator (Ericsson), “FL summary #7 for Potential UE complexity reduction features for RedCap”, 3GPP TSG-RAN WG1 Meeting #103-e, Tdoc R1-2009795, Oct. 26-Nov. 13, 2020, 61 Pages, e-Meeting.
Vivo et al., “Framework and Principles for Reduced Capability NR devices”, 3GPP TSG RAN WG1 #102-e, R1-2005386, Aug. 17-28, 2020, 5 Pages, e-Meeting.
ZTE, “Potential UE complexity reduction features”, 3GPP TSG RAN WG1#102-e, R1-2005474, Aug. 17-28, 2020, 19 Pages, e-Meeting.
“3rd Generation Partnership Project; Technical Specification Group Radio Access Network; Study on support of reduced capability NR devices (Release 17)”, 3GPP TR 38.875 V0.1.0, Technical Report, (Nov. 2020), 112 Pages.
“3rd Generation Partnership Project; Technical Specification Group Radio Access Network; NR; User Equipment (UE) radio access capabilities (Release 16)”, 3GPP TS 38.306 V16.2.0, Technical Specification, (Sep. 2020), 126 Pages.
“3rd Generation Partnership Project; Technical Specification Group Radio Access Network; NR; NR and NG-RAN Overall Description; Stage 2 (Release 16)”, 3GPP TS 38.300 V16.3.0, Technical Specification, (Sep. 2020), 148 Pages.
“3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)”, 3GPP TS 36.300 V16.3.0, Technical Specification, (Sep. 2020), 390 Pages.
“3rd Generation Partnership Project; Technical Specification Group Radio Access Network; Evolved Universal Terrestrial Radio Access (E-UTRA); Physical layer procedures (Release 13)”, 3GPP TS 36.213 V13.11.0, Technical Specification, (Sep. 2018), 395 Pages.
“3rd Generation Partnership Project; Technical Specification Group Radio Access Network; Evolved Universal Terrestrial Radio Access (E-UTRA); Radio Resource Control (RRC); Protocol specification (Release 13)”, 3GPP TS 36.331 V13.11.0, Technical Specification, (Sep. 2018), 645 Pages.
“3rd Generation Partnership Project; Technical Specification Group Radio Access Network; NR; Radio Resource Control (RRC) protocol specification (Release 16)”, 3GPP TS 38.331 V16.2.0, Technical Specification, (Sep. 2020), 921 Pages.
“Ericsson, Revised SID on Study on support of reduced capability NR devices”, 3GPP TSG RAN Meeting #89e, RP-201677, (revision of RP-191386), Sep. 14-18, 2020, 4 Pages, Electronic Meeting.
zte:“Potential UE complexity reduction features”,3GPP TSG RAN WG1 #103-e, e-Meeting, Oct. 26-Nov. 13, 2020, R1-2007715, total 20 pages.
Ericsson:“UE identification and access restriction for RedCap”,3GPP TSG-RAN WG1 Meeting #103-e, e-Meeting, Oct. 26-Nov. 13, 2020, R1-2007533, total 4 pages.
Huawei, HiSilicon:“Identification and access restriction of RedCap UE”,3GPP TSG-RAN WG2 Meeting #112-e, Electronic, Nov. 2-13, 2020, R2-2009934, total 5 pages.

* cited by examiner

METHOD AND APPARATUS FOR IDENTIFICATION OF REDCAP UES

CROSS-REFERENCE TO RELATED APPLICATIONS

This patent application is a continuation of International Patent Application No. PCT/US2021/062060, filed on Dec. 6, 2021, and entitled "Method and Apparatus for Identification of RedCap UEs," which claims priority to U.S. Provisional Application No. 63/122,414, filed on Dec. 7, 2020, and entitled "Multipath Identification of RedCap UEs," and to U.S. Provisional Application No. 63/250,751, filed on Sep. 30, 2021, and entitled "Multipath Identification of RedCap UEs," applications of which are hereby incorporated by reference herein as if reproduced in their entireties.

TECHNICAL FIELD

The present disclosure relates generally to telecommunications, and in particular embodiments, to techniques and mechanisms for identification of reduced capability (RedCap) user equipments (UEs).

BACKGROUND

The Third Generation Partnership Project (3GPP) has been developing and standardizing several important features with fifth generation (5G) new radio (NR) access technology. At RAN #86 (3GPP RP-201677, July 2020), a Rel-17 approved new Study Item (SI) targeting the support of reduced capability (RedCap) NR devices (e.g., user equipments (UEs)). RedCap UEs are NR entities serving relatively low end services, but with requirements different than typical cellular UEs, e.g., a RedCap UE may have an extremely long battery life. RedCap UEs are envisioned for at least three different scenarios: industrial sensors, video surveillance, and wearables. It is desirable to develop mechanisms to facilitate communications of RedCap UEs.

SUMMARY

Technical advantages are generally achieved, by embodiments of this disclosure which describe techniques and mechanisms for identification of reduced capability (RedCap) user equipments (UEs).

According to one aspect of the present disclosure, a method is provided that includes: determining, by a user equipment (UE) based on a criterion, whether to indicate, to a gNB, that it is a reduced capability (RedCap) UE during a random access (RA) procedure of the UE or after the RA procedure, the RedCap UE having a quantity of receive branches less than a minimum number of receive branches of a non-RedCap UE, or having a bandwidth less than a minimum bandwidth of the non-RedCap UE; and indicating, by the UE to the gNB, that it is the RedCap UE according to a determination result.

Optionally, in any of the preceding aspects, the non-RedCap UE is a legacy UE.

Optionally, in any of the preceding aspects, the RedCap UE has one or two receive branches.

Optionally, in any of the preceding aspects, the minimum number of receive branches for the non-RedCap UE is 4 for frequency range 1 (FR1) and is 2 for frequency range 2 (FR2).

Optionally, in any of the preceding aspects, the indicating comprises: sending, by the UE to the gNB when determining to indicate during the RA procedure, a first message indicating the UE as the RedCap UE during the RA procedure, the first message comprising a message 1 (Msg1) of the RA procedure, a message 3 (Msg3) of the RA procedure, or a message A (MsgA) of the RA procedure of the RA procedure.

Optionally, in any of the preceding aspects, the method further includes: determining, by the UE before the RA procedure, the first message based on a radio resource control (RRC) configuration that is broadcast by the gNB and received by the UE before the RA procedure.

Optionally, in any of the preceding aspects, the RRC configuration comprises information of the criterion.

Optionally, in any of the preceding aspects, the first message is sent by the UE according to a physical random access channel (PRACH) configuration that is broadcast by the gNB and received by the UE before the RA procedure, the PRACH configuration comprising a RACH preamble, a RACH occasion, or a combination thereof, which is associated with indicating RedCap UEs.

Optionally, in any of the preceding aspects, the method further includes: receiving, by the UE from the gNB during the RA procedure, a message 2 (Msg2) or a message 4 (Msg4) according to a received coverage recovery technique.

Optionally, in any of the preceding aspects, the first message is the Msg1, and the method further comprises: repeating, by the UE, a transmission of the Msg3 to the gNB.

Optionally, in any of the preceding aspects, a number of repetitions of the transmission of the Msg3 is in accordance with a RACH configuration.

Optionally, in any of the preceding aspects, repeating the transmission of the Msg3 is performed when a reference signal received power (RSRP) measurement of the UE is less than a threshold.

Optionally, in any of the preceding aspects, the indicating comprises: sending, by the UE to the gNB when determining to indicate after the RA procedure, information of UE capability indicating the UE as the RedCap UE after the RA procedure is completed.

Optionally, in any of the preceding aspects, the criterion is based on a number of receive branches of the UE, a reference signal received power (RSRP) measured by the UE, a reference signal received quality (RSRQ) measured by the UE, a reference signal strength indicator (RSSI) measured by the UE, or a combination thereof.

Optionally, in any of the preceding aspects, the criterion is based on capability of the UE.

Optionally, in any of the preceding aspects, the determining comprises: when the UE has two receive branches, determining, by the UE, to indicate the UE as the RedCap UE after the RA procedure; or when the UE has one receive branch, determining, by the UE, to indicate the UE as the RedCap UE during the RA procedure.

Optionally, in any of the preceding aspects, the determining comprises: when the UE has two receive branches and is operable in frequency range 1 (FR1) or FR2, determining, by the UE, to indicate the UE as the RedCap UE after the RA procedure; when the UE has one receive branch and is operable in FR1 or FR2, determining, by the UE, to indicate the UE as the RedCap UE during the RA procedure; or when the UE has two receive branches and is operable in FR1, determining, by the UE, to indicate the UE as the RedCap UE during the RA procedure.

Optionally, in any of the preceding aspects, the determining comprises: comparing, by the UE, a RSRP measurement with a threshold configured for RedCap UEs; when the RSRP measurement is greater than the threshold, determining, by the UE, to indicate the UE as the RedCap UE after the RA procedure; or when the RSRP measurement of the UE is less than or equal to the threshold, determining, by the UE, to indicate the UE as the RedCap UE during the RA procedure.

Optionally, in any of the preceding aspects, the determining comprises: comparing, by the UE, a RSRP measurement with a threshold configured for RedCap UEs; when the UE has two receive branches and the RSRP measurement is greater than the threshold, determining, by the UE, to indicate the UE as the RedCap UE after the RA procedure; when the UE has two receive branches and the RSRP measurement of the UE is less than or equal to the threshold, determining, by the UE, to indicate the UE as the RedCap UE during the RA procedure; or when the UE has one receive branch, determining, by the UE, to indicate the UE as the RedCap UE during the RA procedure.

Optionally, in any of the preceding aspects, the determining comprises: comparing, by the UE, a RSRP measurement with a threshold configured for RedCap UEs; when the UE has one receive branch and the RSRP measurement is greater than the threshold, determining, by the UE, to indicate the UE as the RedCap UE after the RA procedure; when the UE has one receive branch and the RSRP measurement is less than or equal to the threshold, determining, by the UE, to indicate the UE as the RedCap UE during the RA procedure; or when the UE has two receive branches, determining, by the UE, to indicate the UE as the RedCap UE after the RA procedure.

According to another aspect of the present disclosure, a method is provided that includes: receiving, by a gNB from a user equipment (UE), a first message during a random access (RA) procedure; determining, by the gNB, whether the first message indicates that the UE is a reduced capability (RedCap) UE, the RedCap UE having a quantity of receive branches less than a minimum number of receive branches of a non-RedCap UE, or having a bandwidth less than a minimum bandwidth of the non-RedCap UE; when the first message indicates the UE as the RedCap UE, sending, by the gNB, a second message to the UE during the RA procedure according to a coverage recovery technique; and when the first message does not indicate the UE as the RedCap UE, determining, by the gNB, whether the UE is the RedCap UE after the RA procedure is completed.

Optionally, in any of the preceding aspects, the non-RedCap UE is a legacy UE.

Optionally, in any of the preceding aspects, the RedCap UE has one or two receive branches.

Optionally, in any of the preceding aspects, the minimum number of receive branches of the non-RedCap UE is 4 for frequency range 1 (FR1) and is 2 for frequency range 2 (FR2).

Optionally, in any of the preceding aspects, the first message comprises a message 1 (Msg1) of the RA procedure, a message 3 (Msg3) of the RA procedure, or a message A (MsgA) of the RA procedure.

Optionally, in any of the preceding aspects, the first message is based on a physical random access channel (PRACH) configuration broadcasted by the gNB, the PRACH configuration comprising a RACH preamble, a RACH occasion, or a combination thereof, which are associated with indicating RedCap UEs.

Optionally, in any of the preceding aspects, the second message is a message 2 (Msg2) of the RA procedure, or a message 4 (Msg4) of the RA procedure.

Optionally, in any of the preceding aspects, the method further comprises: receiving, by the gNB from the UE, information of UE capability indicating the UE as the RedCap UE after the RA procedure is completed.

Optionally, in any of the preceding aspects, the method further comprises: broadcasting, by the gNB to the UE, information of a criterion enabling the UE to determine whether to indicate, to the gNB, the UE as the RedCap UE during the RA procedure or after the RA procedure based on the criterion.

Optionally, in any of the preceding aspects, the criterion is based on a number of receive branches of the UE, a reference signal received power (RSRP) measurement of the UE, a reference signal received quality (RSRQ) measurement of the UE, a reference signal strength indicator (RSSI) of the UE, or a combination thereof.

Optionally, in any of the preceding aspects, the criterion is based on capability of the UE.

Optionally, in any of the preceding aspects, the criterion comprises: when the UE has two receive branches, indicating the RedCap UE after the RA procedure; or when the UE has one receive branch, indicating the RedCap UE during the RA procedure.

Optionally, in any of the preceding aspects, the criterion comprises: when the UE has two receive branches and is operable in frequency range 1 (FR1) or FR2, indicating the RedCap UE after the RA procedure; when the UE has one receive branch and is operable in FR1 or FR2, indicating the RedCap UE during the RA procedure; or when the UE has two receive branches and is operable in FR1, indicating the RedCap UE during the RA procedure.

Optionally, in any of the preceding aspects, the criterion comprises: when a RSRP measured by the UE is greater than a threshold, indicating the RedCap UE after the RA procedure; or when the RSRP measured by the UE is less than or equal to the threshold, indicating the RedCap UE during the RA procedure.

Optionally, in any of the preceding aspects, the criterion comprises: when the UE has two receive branches and a RSRP measured by the UE is greater than a threshold, indicating the RedCap UE after the RA procedure; when the UE has two receive branches and the RSRP measured by the UE is less than or equal to the threshold, indicating the RedCap UE during the RA procedure; or when the UE has one receive branch, indicating the RedCap UE during the RA procedure.

Optionally, in any of the preceding aspects, the criterion comprises: when the UE has one receive branch and a RSRP measured by the UE is greater than a threshold, indicating the RedCap UE after the RA procedure; when the UE has one receive branch and a RSRP measured by the UE is less than or equal to the threshold, indicating the RedCap UE during the RA procedure; or when the UE has two receive branches, indicating the RedCap UE after the RA procedure.

Optionally, in any of the preceding aspects, the method further comprises: broadcasting, by the gNB, information indicating that the gNB supports RedCap UEs.

According to another aspect of the present disclosure, an apparatus is provided that includes: a non-transitory memory storage comprising instructions; and one or more processors in communication with the memory storage, wherein the instructions, when executed by the one or more processors, cause the apparatus to perform a method in any of the preceding aspects.

According to another aspect of the present disclosure, a non-transitory computer-readable media storing computer instructions, that when executed by one or more processors of an apparatus, cause the apparatus to perform a method in any of the preceding aspects.

According to another aspect of the present disclosure, a system is provided that includes a user equipment (UE) and a gNB; wherein the UE is configured to perform: determining, based on a criterion, whether to indicate, to the gNB, that the UE is a reduced capability (RedCap) UE during a random access (RA) procedure of the UE or after the RA procedure, the RedCap UE having a quantity of receive branches less than a minimum number of receive branches of a non-RedCap UE, or having a bandwidth less than a minimum bandwidth of the non-RedCap UE; and indicating, to the gNB, that the UE is the RedCap UE according to a determination result; and wherein the gNB is configured to perform: receiving, from the UE, a first message during a random access (RA) procedure; determining whether the first message indicates that the UE is the RedCap UE; when the first message indicates the UE as the RedCap UE, sending a second message to the UE during the RA procedure according to a coverage recovery technique; and when the first message does not indicate the UE as the RedCap UE, determining whether the UE is the RedCap UE after the RA procedure is completed.

Aspects of the present disclosure enable a RedCap UE to identify that it is RedCap during a RA procedure (early identification) or after a RA procedure (normal identification), and allows a mixture of RedCap UE identification (e.g., some RedCap UEs may perform early identification and some RedCap UEs may perform normal identification). This enables the network to take measure to compensate for link budget loss of the RedCap UE in communications with the network, and improves communication reliability and user experience.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
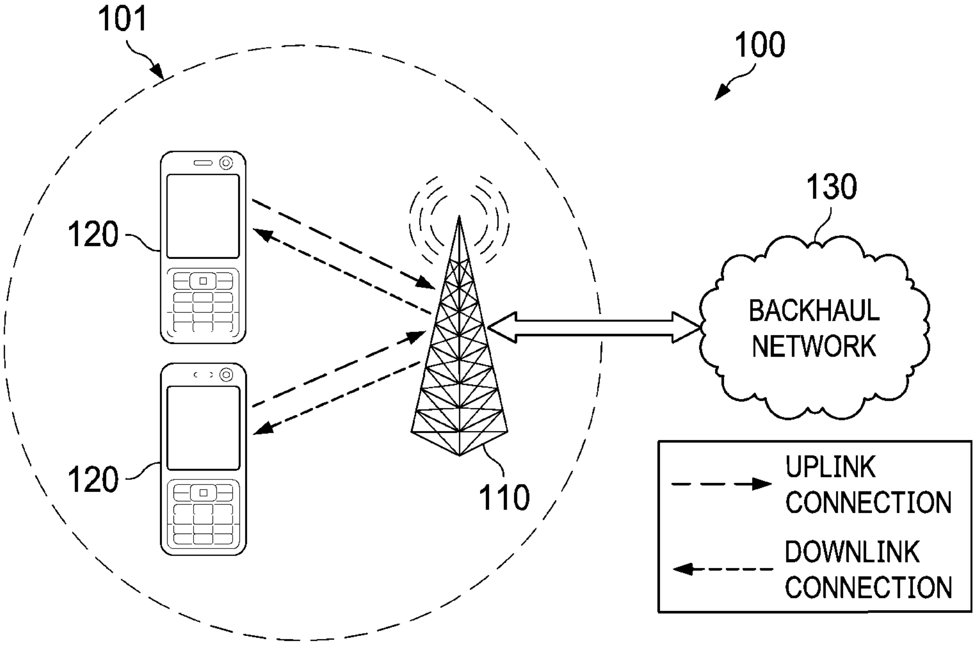
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Reduced capability (RedCap) user equipments (UEs) suffer from performance degradation due to the use of complexity reduction features/techniques. A RedCap UE may be a UE that has a quantity of receive branches less than the minimum number of receive branches of a non-RedCap UE, that has a bandwidth less than the minimum bandwidth of the non-RedCap UE, and/or that has other reduced capabilities. In order to compensate for the degradation, coverage recovery techniques, such as repetitions, lower modulation and coding scheme (MCS) tables and/or transport block (TB) scaling, may be used. Applying these coverage recovery techniques may rely on identifying or indicating that a UE is a RedCap UE, as a gNB is unaware of presence of RedCap UEs before the UEs access the gNB. If a gNB can know whether a UE is a RedCap UE early, the gNB can use one or more of these techniques to improve performance for that RedCap UE.

Embodiments of the present disclosure provide mechanisms that enable RedCap UEs to identify themselves during a random access (RA) procedure (referred to as early identification) or after the RA procedure (referred to as normal identification). The embodiments thus allow a mixture of RedCap UE identification, e.g., some RedCap UEs may perform early identification and some RedCap UEs may perform normal identification. This provides flexibility for a RedCap UE to determine when to identify itself, and enables the network to utilize coverage recovery techniques to improve communication performance of the RedCap UE.

According to one embodiment, a UE may determine, based on a criterion, whether to indicate, to a gNB, that it is a RedCap UE during a RA procedure of the UE or after the RA procedure, and then indicate, to the gNB, that it is the RedCap UE according to a determination result. For example, the UE may indicate that it is a RedCap UE in a message 1, message 3 or a message A of the RA procedure, or in a message 5 after the RA procedure.

According to another embodiment, a gNB may receive, from a UE, a first message during a RA procedure, and determine, whether the first message indicates that the UE is a RedCap UE. When the first message indicates the UE as the RedCap UE, the gNB may send a second message to the UE during the RA procedure according to a coverage recovery technique. When the first message does not indicate the UE as the RedCap UE, the gNB may determine whether the UE is the RedCap UE after the RA procedure is completed.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data and control information from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
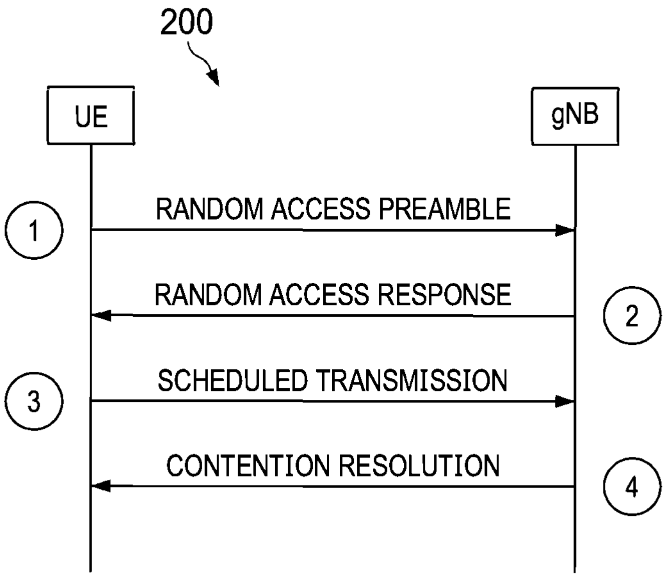
FIG. 2 (PRIOR ART)
FIG. 2 is a diagram illustrating a 4-step random access procedure according to 3GPP TS38.300.
Figure 9:
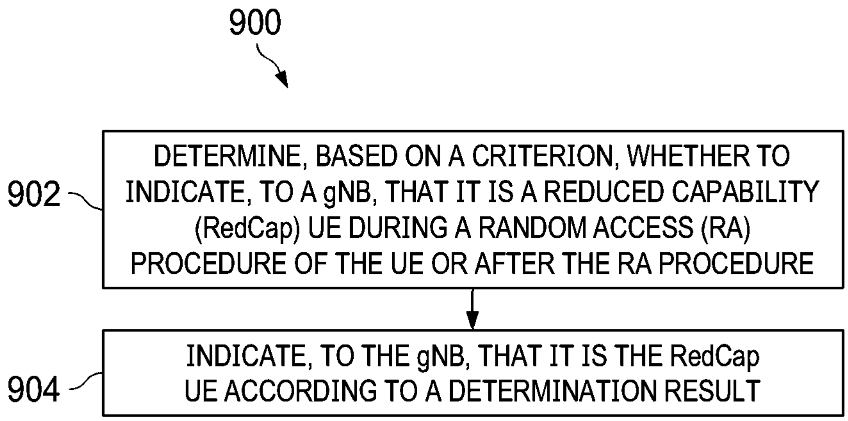
FIG. 9 is a diagram of an embodiment RedCap UE indication method.

FIG. 2 is a diagram illustrating a 4-step random access procedure according to FIG. 9.6.2-1 of 3GPP TS38.300. The overall contention based random-access (CBRA) procedure from Rel-15 is a four-step procedure, as shown in FIG. 2, and consists of transmitting a random-access preamble (message 1 (Msg1)) in a PRACH occasion, receiving a random-access response (RAR) message in a physical downlink shared channel (PDSCH) scheduled through a physical downlink control channel (PDCCH) (message 2 (Msg2)), transmitting a message 3 (Msg3) in a physical uplink control channel (PUSCH), and receiving a message 4 (Msg4) in a PDSCH that is scheduled by DCI in a PDCCH for contention resolution. Before a UE can attempt to access the network, it may need to synchronize (in time and frequency) to the downlink and receive the master information block (MIB) and system information block(s) (SIBs) via a physical broadcast channel (PBCH) and a PDCCH/PDSCH. After receiving the SIB (primarily SIB1), the UE has knowledge of the physical random access channel (PRACH) configuration and transmission parameters. A random access procedure or process may be referred to as a RACH or RA procedure/process.

Figure 3:
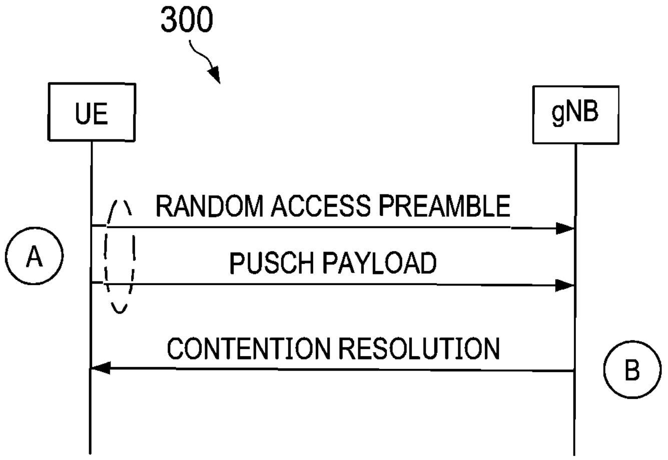
FIG. 3 (PRIOR ART)
FIG. 3 is a diagram illustrating a 2-step random access procedure according to 3GPP TS38.300.

In order to reduce latency, a two-step procedure for a random access (RA) procedure was standardized in Rel-16 and is shown in FIG. 3. The description of the two-step procedure from TS38.300 is reproduced below:

"The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure as shown in FIG. 9.2.6-1(*d*). For CBRA, if contention resolution is successful upon receiving the network response, the UE ends the random access procedure as shown in FIG. 9.2.6-1(*b*); while if fallback indication is received in MSGB, the UE performs MSG3 transmission using the UL grant scheduled in the fallback indication and monitors contention resolution as shown in FIG. 9.2.6-2. If contention resolution is not successful after MSG3 (re)transmission(s), the UE goes back to MSGA transmission."

That is, in the two-step RA procedure, a UE sends a message A (MsgA) to a gNB, where the MsgA includes a preamble on a PRACH and a payload on a PUSCH. The gNB sends a message B (MsgB) in response. In essence, the MsgA can be viewed as the equivalent of sending Msg1 and Msg3 together, and the MsgB is the equivalent of Msg2 and Msg4.

At RAN #86 (3GPP RP-201677, July 2020), a new Study Item (SI) was approved targeting the support of reduced capability (RedCap) NR devices (e.g., user equipments (UEs)). The SI includes the following objectives:

"Identify and study potential UE complexity reduction features:

Reduced number of UE RX/TX antennas

UE Bandwidth reduction

Note: Rel-15 SSB bandwidth should be reused and Li changes minimized

Half-Duplex-FDD

Relaxed UE processing time

Relaxed UE processing capability."

RedCap UEs are NR entities serving relatively low end services, but with requirements/features different than typical cellular UEs (non-RedCap UEs). For example, a Redcap UE may have an extremely long battery life. A RedCap UE may refer to a UE that has a quantity of receive (Rx or RX) branches less than the minimum number of receive branches of a non-RedCap UE, that has a bandwidth less than the minimum bandwidth of the non-RedCap UE, and/or that has other reduced capabilities. A non-RedCap UE may refer to a UE having the minimum requirements of UEs specified in Rel. 15 and Rel 16 (3GPP TS38-306, (Release 16), Version 16-2, 2020-10-02). A non-RedCap UE may also be referred to as a legacy UE or a normal UE. As an example, the minimum number of receive branches for the non-RedCap UE is 4 for frequency range 1 (FR1) and is 2 for frequency range 2 (FR2). A RedCap UE may have one or two receive branches. As another example, for FR1 frequency division duplex (FDD) or FR2 bands where a non-RedCap UE is required to be equipped with a minimum of 2 Rx branches, the minimum number of Rx branches supported by a RedCap UE is 1. The work item description (WID) also shows supporting of 2 Rx branches for a RedCap UE. As another example, a RedCap UE may have a maximum bandwidth of 20 MHz for FR1, and 100 MHz for FR2, while a non-RedCap UE may have a minimum of 100 MHz and 400 MHz bandwidth for FR1 and FR2, respectively. As another example, a RedCap UE may have a maximum number of DL multi-input multi-output (MIMO) layers (e.g., a RedCap UE having one Rx branch may have a maximum of one MIMO layer, and a RedCap UE having two Rx branches may have a maximum of two MIMO layers). As another example, a RedCap UE may have a reduced maximum modulation order (256QAM in the DL is optional). A RedCap UE may support half duplex (HD)-FDD type A.

A receive branch can have one or more receive antennas. A receive branch is associated with a receiver chain. Typically, for FR1, there is one physical antenna per branch. In this case, the number of branches equals the number of antennas. For FR2, there is typically combining of multiple physical antennas (beamforming) signals in each branch. In this case, it is possible to have multiple, e.g., 64, antennas per branch.

For the reduced number of UE antennas/branches feature in the SI, the following was captured in 3GPP TR 38.875, Clause 7.2.4, V0.1.0, "Technical Specification Group Radio Access Network; Study on support of reduced capability NR devices," (Release 17) 2020-11-25:

"In general, RedCap UEs with reduced number of Rx branches can coexist with legacy UEs. However, the presence of RedCap UEs with reduced number of Rx branches may impact the performance for legacy UEs if some broadcast channels are used for both legacy UEs and RedCap UEs. This is because, if there is no early indication of RedCap UE, both legacy UEs and RedCap UEs will be treated the same by the network, which may lead to conservative treatment of all UEs."

In the studied scenarios in the SI, it was observed that no compensation on the downlink (DL) was needed for Msg2/Msg4 for a RedCap UE having 2 RX branches, whereas for a RedCap UE with 1 RX branch, up to 6 dB compensation may be needed, as explained in the following. Therefore, it is advantageous to have early identification/indication of RedCap UEs with one 1 RX branch, so that Msg2/Msg4 can be transmitted with the appropriate radio parameters due to the 1 RX branch performance limitation. That is, a RedCap UE may indicate or identify, to the network (e.g., a gNB), that it is a RedCap UE at an early stage of access to the network. Note, however, that such early identification/indication may not (or rarely) be needed for RedCap UEs with 2 RX branches.

Coverage Extension Analysis for Initial Access

The use of complexity reduction techniques and features may cause coverage degradation, which may be due to, for example, a loss in frequency diversity (from having smaller bandwidth) and/or fewer receive branches (loss of diversity and/or spatial multiplexing).

Multiple scenarios for coverage recovery evaluation were considered during random access processes of RedCap UEs. Both FR1 and FR2 scenarios were considered. Frequency range 1 (FR1) spans approximately between 600 MHz and 7.25 GHz, and FR2 spans approximately between 24.25 GHz to 47 GHz. Link budgets for several channel and messages were evaluated for the following example scenarios: FR1 Urban at 4 GHz (scenario 1), FR1 Urban at 2.6 GHz (scenario 2) and FR2 indoor (scenario 3).

As an example, it was estimated that for all FR1 scenarios, a 3 dB loss in link budget due to a small scale form factor may need to be compensated for PUSCH (including Msg3). It was also estimated that for the Urban 4 GHz scenario 1, when the number of receive branches is 1, a 5-6 dB compensation may be needed for Msg2 and a 2-3 dB compensation needed for Msg4. A summary of the amount of compensation needed for the channels and messages for the Urban 4 GHz scenario 1 when a RedCap UE has one receive antenna is shown in Table 1 below. Some of the channels and messages may need coverage recovery.

TABLE 1

| Channel/Message | Compensation Amount dB |
|---|---|
| Msg2 | 5-6 |
| PUSCH/Msg3 | 3 |
| Msg4 | 2-3 |
| PDCCH | 1 |

The following is observed:

It was estimated that a 3 dB (due to small form factor) compensation may be required for the successful detection of the PUSCH/Msg3 at the base station because the UE transmit power may be incorrect (e.g., minimal power control is used). With a small form factor, the distance between two receive branches may be closer than one half wavelength. As a result, it is difficult to obtain a 3 dB gain from receive diversity. Another factor is that the estimation of the downlink power may be less accurate with a small form factor, which affects the transmit power for Msg1 and Msg3. For successful detection of the PUSCH/Msg3, the UE may have to compensate for the loss by using a coverage compensation technique such as repetition. Applying any of the techniques may rely on identifying the UE as a RedCap UE. In other words, the gNB may need to know that the UE is a RedCap UE early in the RACH process.

It was estimated that a 5-6 dB coverage loss may be required for the successful detection of the Msg2 random access response (RAR) for the case where the RedCap UE has one receive branch. As such, early identification/indication of the UE as a RedCap UE in Msg1 is necessary which would assist the gNB in knowing when to apply the coverage recovery techniques for the identified RedCap UE in the downlink. This may also assist the gNB in the optimization of resources for RedCap UEs and normal (legacy) UEs (UE that may not require any coverage enhancement).

Table 2 below shows channel and messages that require coverage recovery for the Urban 4 GHz scenario 1 when a RedCap UE has 2 Rx branches. It is worth noting that when the number of receive branches is 2, no coverage recovery is needed for Msg2, Msg4 and PDCCH, as indicated in Table 2. That is, for FR1 including both FDD and TDD bands and for the RedCap UE with 2 Rx branches and reduced antenna efficiency, it was shown that the maximum isotropic loss(es) (MIL(s)) of all downlink channels are better than that of the bottleneck channel for a reference NR UE, and coverage recovery is not needed for downlink channels of the RedCap UE.

TABLE 2

| Channel/Message | Compensation Amount dB |
|---|---|
| Msg2 | 0 |
| PUSCH/Msg3 | 3 |
| Msg4 | 0 |
| PDCCH | 0 |

Table 3 below shows performance degradation of a UE from using 4 Rx branches to 2 Rx branches and from using 4 Rx branches to 1 Rx branch, which is based on the simulation studies of Urban scenarios in 3GPPTR 38.875 V0.1.0 (release 17). CSS represents the common search space, and USS represents the UE-specific search space.

TABLE 3

| | Urban scenario 2 Rx branches | | Urban scenario 1 Rx branch | |
|---|---|---|---|---|
| Channel | 2.6 GHz | 4 GHZ | 2.6 GHz | 4 GHZ |
| CSS PDCCH | 5.6 dB | 5.3 dB | 9.3 dB | 9.4 dB |
| USS PDCCH | 5.8 dB | 5.3 dB | 9.4 dB | 8.8 dB |
| PDSCH | 6.4 dB | 6.3 dB | 9.6 dB | 10.1 dB |
| Msg2 | 6.0 dB | 5.2 dB | 10.4 dB | 9.7 dB |
| Msg4 | 5.9 dB | 5.4 dB | 9.8 dB | 9.5 dB |

For successful uplink synchronization and obtaining the grant for initial attachment, the messages involved in a RACH procedure/process should not be coverage limited, which, however, may be the case for RedCap UEs due to the complexity reduction features/techniques. In order to compensate for such loss, coverage recovery techniques may be used. For example, repetitions, lower modulation and coding scheme (MCS) tables and/or transport block (TB) scaling, may be used to compensate for the loss due to complexity reduction. A discussion on the coverage recovery techniques is out of scope of this disclosure. Applying these coverage recovery techniques may rely on identifying or indicating that a UE is a RedCap UE, as a gNB is unaware of any presence of RedCap UEs before the UEs access the gNB. If a gNB can know whether a UE is a RedCap UE early in a RACH process, the gNB can use one or more of these techniques to improve performance for that RedCap UE.

In addition, note that while coverage limitation is discussed herein, there are other aspects to consider. As an example, a UE may have coverage, but requires a large amount of resources to get a message across. In this case, there is a wastage of resources that needs to be taken care of. As another example, the 5-6 dB penalty (loss) from Msg2 may be handled by always using a repetition factor of 4. However, in this case, the additional overhead is significant (due to repetitions), and it is much better, from a resource efficiency standpoint, to compensate only for UEs that really need compensation.

Early Identification Solutions Discussed in the RedCap SI

In 3GPP TR 38.875, v0.1.0, the following options for RedCap UE identification were discussed:

"Feasibility, necessity, pros and cons for the following schemes for identification of RedCap UEs have been studied:

Option 1: During Msg1 transmission

E.g., via separate initial UL BWP, separate PRACH resource, or PRACH preamble partitioning Option 2: During Msg3 transmission Option 3: Post Msg4 acknowledgment.

E.g., during Msg5 transmission or part of UE capability reporting."

A fourth option for the two-step RA procedure (2-step RACH) was also initially considered, but de-prioritized during the course of the SI.

During the study, it was determined that all 3 options above were feasible. For example, identification in Msg1 may be possible via providing (such as, by configuring configuration information, by standardizing in specification, or via a SIB) PRACH preambles or occasions in time or frequency that are associated with RedCap UEs. The identification may be in the same initial bandwidth part (BWP) or a separate initial BWP. Similarly, identification in Msg3 may also be possible.

If the RedCap UEs have worse performance than normal (legacy, non-RedCap) UEs, this early identification allows the RedCap UEs and the normal UEs to be treated differently, as opposed to having to treat all of the UEs (both RedCap and normal) conservatively due to the possible presence of RedCap UEs. The worse performance may be due to complexity reducing features such as a fewer number of receive branches or due to antenna performance loss for a small form factor.

Initial Access for LTE-M Devices

In Rel-13, the network indicates support of long term evolution-machine type communication (LTE-M) devices by transmitting indications of a PDSCH for SIB1 in a MIB. Initial access for machine type communication (MTC) devices was specified in 3GPP TS 36.213 and 36.331. The RACH process for LTE-M devices has a lot of commonalities with the regular LTE RACH process, and the protocol/exchanged messages are identical.

A MTC UE does not formally identify itself as an MTC device until it sends its UE category. However, some MTC UEs suffer from coverage limitations. As such, the RACH preamble (Msg1) and the MPDCCH/PDSCH (Msg2 and Msg4) may be repeated a number of times. Different coverage levels (also referred to as coverage extension (CE) levels) are defined based on reference signal received power (RSRP) and are defined in the RSRP-ThresholdsPrachInfoList information element (IE) specified in TS 36.331, v16.2.1, as shown in Table 4 below.

TABLE 4

| |
|---|
| RSRP-ThresholdsPrachInfoList-r13 ::= SEQUENCE (SIZE(1..3)) OF RSRP-Range |

The existing PRACH-Config of Rel-12 was augmented to include the RSRP-ThresholdsPrachInfoList according to TS 36.331, v16.2.1, as shown in Table 5 below.

TABLE 5

```
PRACH-Config-v1310 ::=            SEQUENCE {
  rsrp-ThresholdsPrachInfoList-r13    RSRP-ThresholdsPrachInfoList-r13
  OPTIONAL,   -- Cond MP
  mpdcch-startSF-CSS-RA-r13           CHOICE {
    fdd-r13                           ENUMERATED {v1, v1dot5, v2, v2dot5, v4, v5, v8,
                                        v10},
    tdd-r13                           ENUMERATED {v1, v2, v4, v5, v8, v10, v20,
spare}
  }                                                           OPTIONAL,   --
Cond MP
  prach-HoppingOffset-r13             INTEGER (0..94)
  OPTIONAL,   -- Need OR
  prach-ParametersListCE-r13          PRACH-ParametersListCE-r13
  OPTIONAL,   -- Cond MP
  initial-CE-level-r13            INTEGER (0..3)          OPTIONAL-- Need OR
}
```

In addition, RACH-ConfigCommon includes a new IE, rach-CE-LevelInfoList, which is a list of rach-CE-LevelInfo according to TS 36.331, v16.2.1, as shown in Table 6 below (rach-CE-LevelInfoList-r13).

TABLE 6

```
RACH-ConfigCommon ::=       SEQUENCE {
  preambleInfo                  SEQUENCE {
    numberOfRA-Preambles            ENUMERATED {
                                    n4, n8, n12, n16, n20, n24, n28,
                                    n32, n36, n40, n44, n48, n52, n56,
                                    n60, n64},
    preamblesGroupAConfig           SEQUENCE {
      sizeOfRA-PreamblesGroupA        ENUMERATED {
                                      n4, n8, n12, n16, n20, n24, n28,
                                      n32, n36, n40, n44, n48, n52, n56,
                                      n60},
      messageSizeGroupA                 ENUMERATED {b56, b144, b208,
b256},
      messagePowerOffsetGroupB        ENUMERATED {
                                      minusinfinity, dB0, dB5, dB8, dB10, dB12,
                                      dB15, dB18},
      ...
    }     OPTIONAL                                        -- Need OP
  },
  powerRampingParameters          PowerRampingParameters,
  ra-SupervisionInfo            SEQUENCE {
    preambleTransMax              PreambleTransMax,
    ra-ResponseWindowSize           ENUMERATED {
                                    sf2, sf3, sf4, sf5, sf6, sf7,
                                    sf8, sf10},
    mac-ContentionResolutionTimer   ENUMERATED {
                                    sf8, sf16, sf24, sf32, sf40, sf48,
                                    sf56, sf64}
  },
  maxHARQ-Msg3Tx                    INTEGER (1..8),
  ...,
  [[ preambleTransMax-CE-r13      PreambleTransMax          OPTIONAL,
  -- Need OR
    rach-CE-LevelInfoList-r13   RACH-CE-LevelInfoList-r13   OPTIONAL--
Need OR
  ]]
}
```

The rach-CE-LevelInfo contains the physical parameters for each UE at a given CE level which is expected to RACH, as shown in Table 7 below:

TABLE 7

```
RACH-CE-LevelInfo-r13 ::=     SEQUENCE {
  preambleMappingInfo-r13           SEQUENCE {
    firstPreamble-r13               INTEGER(0..63),
    lastPreamble-r13                INTEGER(0..63)
  },
  ra-ResponseWindowSize-r13         ENUMERATED {sf20, sf50, sf80, sf120, sf180,
                                      sf240, sf320, sf400},
  mac-ContentionResolutionTimer-r13 ENUMERATED {sf80, sf100, sf120,
                                      sf160, sf200, sf240, sf480, sf960},
  rar-HoppingConfig-r13           ENUMERATED {on,off},
  ...
}
```

All these IEs are nested into a SIB, as shown in TS 36.331.

With this, it is possible to have normal UEs (legacy) share the PRACH region with the best conditioned (in terms of channel gain conditions, RSRP) LTE-M UEs.

The identification of a UE at a given CE level as a LTE-M UE is performed at the reception of Msg1 at a base station. The UE selects an appropriate preamble according to RSRP. The base station does not know the amount of coverage enhancement is needed until it receives Msg1. The network is unaware of the presence of LTE-M devices until it receives Msg1 in the configured uplink resources. Note, however, the following aspects:

- The early identification is performed based on the selected RACH resources that the UE determines based on RSRP.
- UEs of various CE levels are identified at Msg1, but there is no case of MTC UEs being identified at Msg1 while others are identified at Msg5: such a process is actually impossible to achieve in the current LTE framework, as the base station must monitor an MTC UE, which occupies a limited number of PRBs (6). Thus, it is imperative that an MTC UE be identified at Msg1 so that Msg2 can properly be received.

Embodiments of the present disclosure provide mechanisms that allow a UE to identify itself as a RedCap UE through either Msg5 (or later UE capability exchange) or through early identification, such as at Msg1. That is, at the same time, a gNB may provide configuration to allow some RedCap UEs to be identified early while others are identified at later stages (as opposed to having all RedCap UEs be identified at the same time—either early or not). Some RedCap UEs may have a similar identification as normal UEs (using the current initial access process) until the capability exchange, where they would be identified as RedCap UEs, while other RedCap UEs may be identified at Msg1 or Msg3 stage. For the latter case, additional capability exchange may be done after (or at) Msg5 after the RA procedure.

In comparison with the dedicated initial access procedure for LTE-M devices, the proposed solution for RedCap UE identification allows a mixture of identification (some at early stage—at Msg1 or Msg3, while others at Msg5). It is noted that using dedicated resources is not precluded from the present solution.

In some embodiments, RedCap UE types may be defined (types may be different based on, for example, the number of receive antennas, supported bandwidths or a combination thereof), and in this case, different types of RedCap UEs may be handled—in terms of when identification takes place—along separate paths, i.e., at different stages of a RACH procedure. In this case, a gNB may be able to avoid having to identify all UEs at Msg5, and would also be able to avoid having to identify all UEs at Msg1 or Msg3. With such solution, optimization is possible based on RedCap UE types. In one embodiment, RedCap UE types are defined based on the number of receive antennas/branches that a RedCap UE has or bandwidth supported or both.

As used herein, identifying or indicating that a UE is a RedCap UE may be referred to as identification or indication of a RedCap UE, or as identification or indication of a UE, for the convenience of description. Identification or indication of a RedCap UE before a random access procedure completes (or during the random access procedure), e.g., at the stage of Msg1, Msg3, or MsgA, may be referred to as early identification or indication, or identification or indication at an early stage. Identification or indication of a RedCap UE during capability exchange after a random access procedure completes, as what is conventionally performed, may be referred to as later (or regular, or standard) identification or indication, or identification or indication at a later stage, for the convenience of description. In the following description, the term "path" is used to indicate a way, or a manner of indicating/identifying a UE as a RedCap UE, e.g., by way of early identification/indication or later identification/indication, unless otherwise provided. The terms of "identifying (or identify, identification of) a UE" and "indicating (or indicate, indication of) a UE" are used interchangeably. In the following, "a Redcap UE having n Rx branches" may be referred to as "a nRX RedCap UE", "a nRX UE", or "a UE with nRX" merely for the convenience of description, where n is an integer greater than 0.

In some embodiments, two paths, i.e., Path A and Path B, are defined for indicating that a UE is a RedCap UE:

Path A: A UE is identified as a RedCap UE during Msg5 (exchange of capability). One or more of UE capabilities/feature/feature sets of a UE may be used to identify the UE as a RedCap UE. This could be through the use of one dedicated UE capability (e.g., a feature is defined, such as a RedCap UE), or through a set of existing and or new UE capabilities (e.g., the UE bandwidth, the number of antennas, etc.). In such a case, when some of the UE features are selected from a set of given combinations (e.g., BW 20 MHz, 1 RX antenna), the gNB knows that the UE is a RedCap UE.

Path B: a UE is identified as RedCap earlier than Msg5. This can be, e.g., during the transmission of Msg1, the MsgA or the Msg3. The UE may inform the network that it is a RedCap UE either implicitly (e.g., by using a preamble/resource choice for transmitting Msg1), or explicitly (e.g., through the setting of 1 bit in Msg3).

Path A corresponds to the later identification or indication, and Path B corresponds to the early identification or indication. Path B may also be referred to as an early path. Path A may also be referred to as a regular, later or normal path. It is noted that in the above, Path A has been associated with Msg5 and Path B with Msg1, Msg3, or MsgA.

Figure 4:
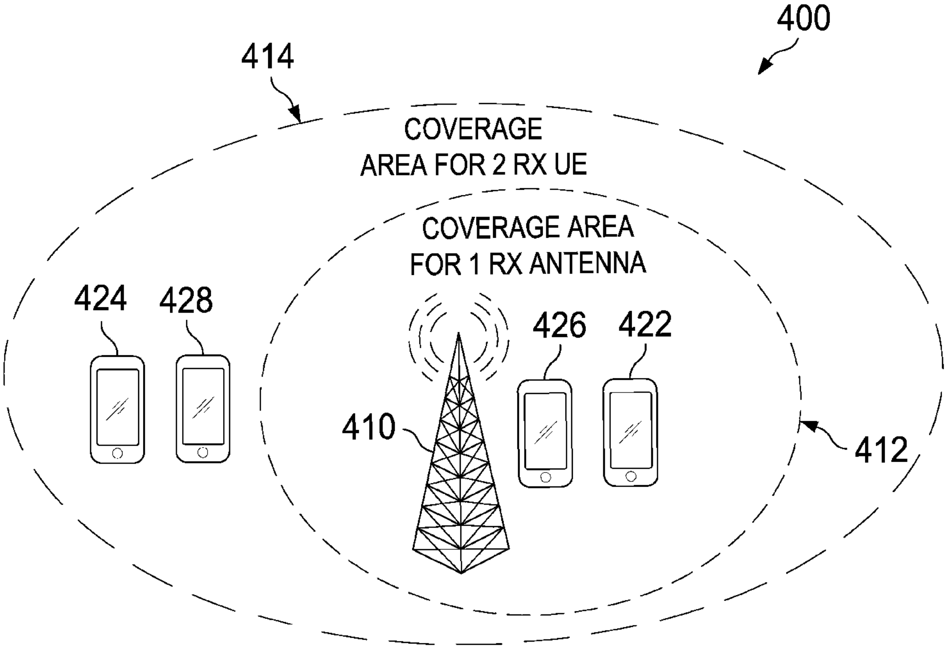
FIG. 4 is a diagram illustrating an embodiment communication network, highlighting example coverage areas and number of antennas/branches of UEs.

FIG. 4 is a diagram illustrating an embodiment communication network 400, highlighting example coverage areas and number of antennas/branches of UEs. As shown, the network 400 includes a gNB 410, which has a coverage area 412 for UEs having one Rx branch and a coverage area 414 for UEs having two Rx branches. RedCap UEs 422 and 424 each have one Rx branch. RedCap UEs 426 and 428 each have two Rx branches. UEs 422 and 426 in the coverage area 412 and UE 428 in the coverage area 414 may use Path A to indicate that they are RedCap UEs. UE 424 in the coverage area 414 may use Path B to indicate that it is a RedCap UEs.

Path A or Path B is used for identification of a RedCap UE. The following provides example criteria (C) C1 and C2:

C1: selection of Path A or Path B is based on the number of receive antennas of the RedCap UE:
  a UE with 2RX (2 Rx antennas/branches) uses Path A
  a UE with 1RX (1 Rx antenna/branch) uses Path B C2: selection of Path A or Path B is based on the number of receive antennas of the RedCap UE and duplexing mode:
  a UE with 2RX uses Path A in FR1 FDD and FR2
  a UE with 1RX uses Path B in FR1 FDD and FR2
  a UE with 2RX uses Path B in FR1 TDD According to the criterion C1, when a UE has two receive branches, the UE may indicate it as a RedCap UE after a RA procedure, and when the UE has one receive branch, it may indicate it as the RedCap UE during the RA procedure.

According to the criterion C2, when the UE has two receive branches and is operable in FR1 FDD bands and FR2 bands, it may indicate that it is a RedCap UE after the RA procedure. When the UE has one receive branch and is operable in FR1 FDD and FR2 bands, it may indicate that it is a RedCap UE during the RA procedure. When the UE has two receive branches and is operable in FR1 TDD bands, it may indicate that it is a RedCap UE during the RA procedure. Note: FR2 is currently defined as TDD. Criteria C1 and C2 above are defined based on the number of Rx antennas. A RedCap UE may support operations on one or multiple frequency bands. However, it is noted that according to the WID objectives, RedCap UEs are not allowed to operate on two or more frequencies simultaneously. In this case, criterion C2 can also apply, with some modification. For example, C2 may be changed to specify that a UE with 2RX uses Path A when the UE is operable in FR1 FDD or in FR2, and a UE with 1RX uses Path B when the UE is operable in FR1 FDD or in FR2. Thus, implementation of the embodiment criteria for path selection may vary depending on whether the RedCap UEs are allowed to operate on one or multiple frequency bands. Those of ordinary skill in the art would recognize that various modification, alternatives and embodiments of criteria may be applicable for a UE to select a path for identifying that it is a RedCap UE, without departing from the spirit and principle of the present disclosure.

In some embodiments, criteria may be defined based on the bandwidth or bands. As an example, for a first band (or first bands), e.g. where the bandwidth is greater than 20 MHz, a RedCap UE may use early indication, and for a second band (or second bands), e.g. where the bandwidth is not greater than 20 MHz, a RedCap UE may indicate itself as a RedCap UE during capability exchange (Msg5).

In some embodiments, criteria may also be defined based on one or more other parameters, such as parameters indicating radio channel conditions, including RSRP (before or after antenna combining), reference signal received quality (RSRQ), reference signal strength indicator (RSSI), and so on. As an example, a possible criterion C3 may be as follows:

C3: the selection of Path A or Path B is based on RSRP after antenna combining:
- a UE with RSRP>threshold uses Path A
- a UE with RSRP≤threshold uses Path B In general, the estimated signal quality may be performed for each branch individually, and the highest signal quality may be used. Signal quality estimate may also be based on two or more branches, where the signals from antennas/branches are combined. For example, the estimate of the received power may be based on the sum (in the linear domain) of estimate for each branch. In a specific example, one RSRP estimate is −80 dBm and a second RSRP estimate is −83 dBm, the combined estimate is −78.2 dBm.

According to the criterion C3, a UE may compare a RSRP measurement with a threshold configured for RedCap UEs for identification. When the RSRP measurement is greater than the threshold, the UE indicates it as a RedCap UE after a RA procedure. When the RSRP measurement of the UE is less than or equal to the threshold, the UE indicates it as the RedCap UE during the RA procedure.

C3 has a single threshold for the UE. In some embodiments, the UE may select or modify the single threshold provided based on its type (RedCap type as discussed above) or capability, assuming that the differences between different threshold values would not naturally show up on the RSRP metric used by the UE to determine which Path to use. For instance, if the RSRP measurement would be 3 dB with a doubling of the number of RX antennas, there may be no need for multiple thresholds. However, with other measures (e.g., RSRP measured on one antenna only), a factor may be added to the threshold. Or, optionally, a correction based on a small form factor dB may be performed on the threshold.

The threshold may be associated with a coverage area. For example, the "coverage area 412 for UEs having 1 RX antenna" in FIG. 4 may be associated with a first threshold, and the "coverage area 414 for UEs having 2 RX antennas" in FIG. 4 may be associated with a second threshold. UEs in the coverage areas 412 and 414 may use the corresponding thresholds to determine a Path for RedCap UE indication. For C3, a measure of RSRP may be defined, e.g., based on measurements performed on a SSB block, or a demodulation reference signal (DMRS) for a PDCCH. Those of skill in the art would recognize that various measurements of RSRP may be applied to the embodiments of the present disclosure.

Figure 5:
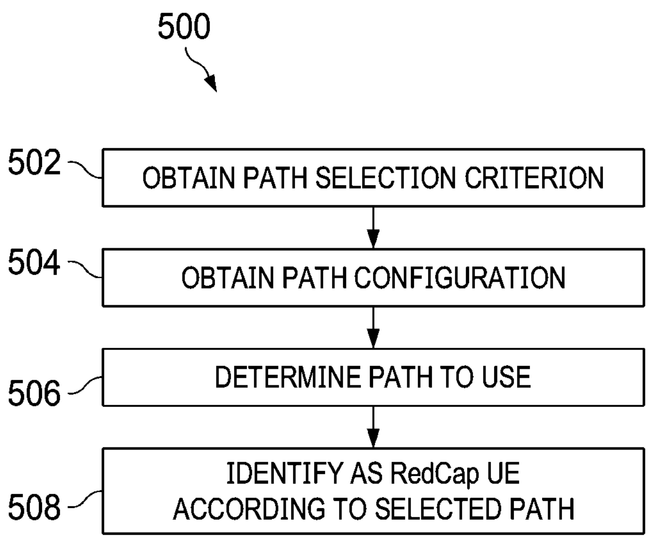
FIG. 5 is a diagram of embodiment operations by a UE for reduced capability (RedCap) indication.

FIG. 5 is a flow diagram 500 illustrating embodiment operations by a UE. The UE may obtain a path selection criterion (block 502). The UE needs to be made aware of the path selection criterion, e.g., C1, C2 or C3. There may be several possibilities for the UE to obtain the path selection criterion. In one embodiment, a standard specification may dictate which path to use by UEs. For instance, for C1, UE behavior may be hardcoded in the standard specification with a sentence, e.g., "A RedCap UE with one receive antenna identifies itself during Msg1 or Msg3." This may indicate C1 or C2 is to be used by the UE. In one embodiment, which path to use by a UE for RedCap UE indication may be pre-configured for the UE. As an example, which path to use may be indicated in a SIB or other signaling message. For instance, for C3, a network/base station may indicate a RSRP threshold in a SIB. This may indicate that C3 is to be used by the UE. The network may signal, implicitly or explicitly, which of the criteria is to be used to identify RedCap UEs.

The UE may obtain a path configuration (block 504). The UE needs to know a) if more than one path exists, and b) what the configuration is for Path B. For a), there may be cases where one path (e.g., Path A) is configured. For instance, in dense deployment scenarios, where gNBs are close to each other, it is expected that even a RedCap UE with only one RX antenna is capable enough to communicate with the gNB without CE measures. Thus, a parameter in a SIB may indicate whether only one path is configured. This signaling may also be explicit based on the configuration for b). For b), the UE needs to obtain the resource configuration for early identification in this example. For instance, if identification is performed during Msg1/MsgA or Msg3, the RedCap UE needs to know which parameter(s) (time resources/PRBs/preambles) are to be used for early indication. A signaling similar to that used for LTE-M devices with various CE levels can be used. Generally, the path configuration may include information about available paths to use, RACH configuration (time-frequency resources, and/or preambles) for early indication, and/or information indicating whether Path B is performed during Msg1 or Msg3, or MsgA.

The UE may determine/select a path to use (block 506). When the RedCap UE has obtained all the relevant RACH configuration parameters, it needs to determine which path to use. In some cases, this operation is trivial and nothing needs to be performed (e.g., with C1, the RedCap UE knows the number of antennas it has, and it may directly select a corresponding path). However, for some cases, the determination requires additional operations. For instance, for C3, the RedCap UE needs to perform RSRP measurements to select the path.

The UE may identify itself as RedCap according to the selected path (block 508). When a path has been selected, the RedCap UE proceeds according to the selected path. For example, if Path A is selected, the UE may not need to do anything special, and may simply send its capabilities (which indicate whether it is a RedCap UE) during the capability exchange, after a RACH process. If Path B is selected, which may indicate, e.g., identification during Msg1, the RedCap UE needs to select a set of resources (time resources/PRB/preamble index) as indicated/configured by the gNB for early identification (Path B).

Figure 6:
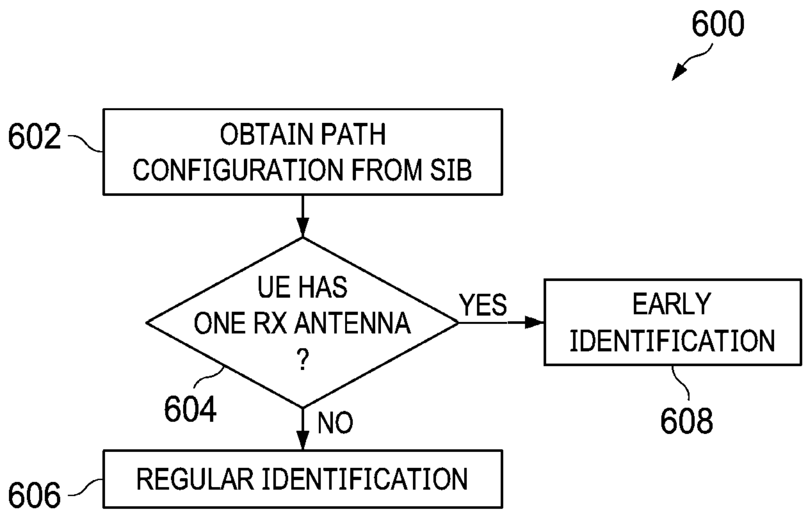
FIG. 6 is a diagram of embodiment operations for path selection based on the criterion C1 for RedCap indication.

FIG. 6 is a diagram 600 illustrating embodiment operations for path selection based on the criterion C1. A UE (a RedCap UE) may obtain a path configuration from a SIB (block 602). The path configuration may be similar to what is described with block 504 of FIG. 5. The UE may then check whether it has one Rx antenna (block 604). When the UE has more than one Rx antenna, the UE may perform regular identification (block 606), i.e., Path A. That is, the UE may identify that it is a RedCap UE after a RACH procedure, e.g., during capability exchange between the UE and the network. When the UE has one Rx antenna, the UE may perform early identification (block 608), i.e., Path B. That is, the UE may identify that it is a RedCap UE during a RACH procedure, e.g., during transmission of Msg1, Msg3 or MsgA.

Figure 7:
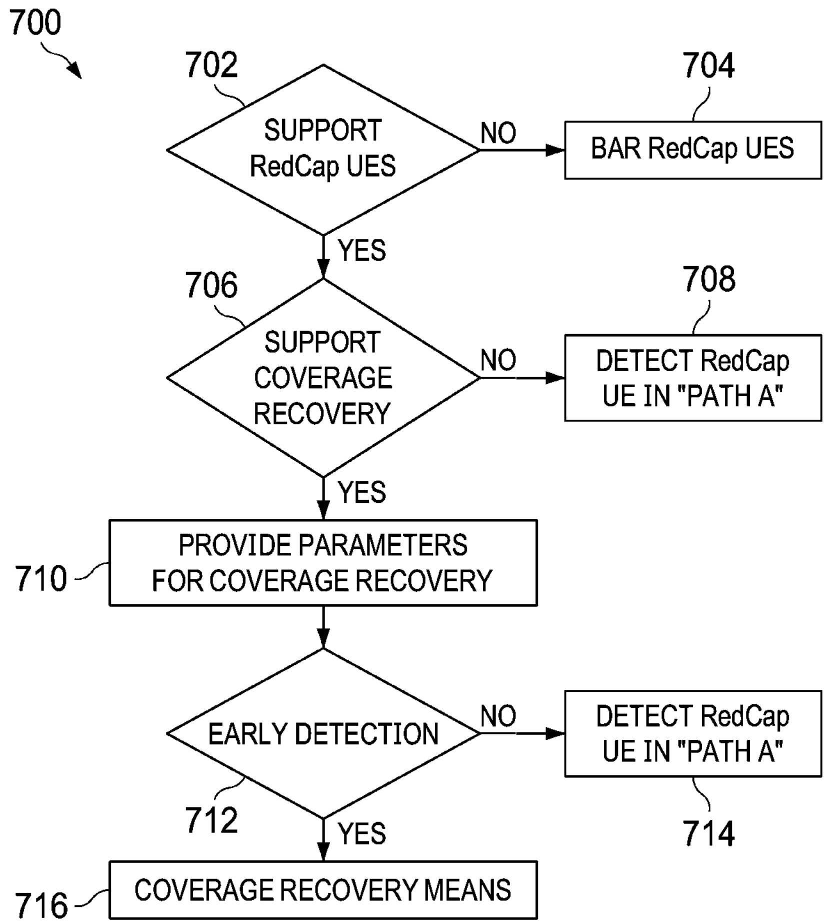
FIG. 7 is a diagram of embodiment operations of a gNB for detection of a RedCap UE.

FIG. 7 is a diagram 700 illustrating embodiment operations of a gNB. The gNB may check whether it supports RedCap UEs (block 702). If the gNB does not support RedCap UEs, the gNB may bar RedCap UEs (block 704). In this case, the gNB may not provide service to RedCap UEs. If the gNB supports RedCap UEs, it may then check whether it supports coverage recovery (block 706). If the gNB does not support coverage recovery, the gNB may detect a RedCap UE according to Path A (block 708). That is, the gNB may know that a UE is a RedCap UE based on an indication/identification performed according Path A. If the gNB supports coverage recovery, the gNB may provide parameters for coverage recovery to UEs (block 710). The gNB may perform early detection (block 712). That is, the gNB may detect, during a RACH procedure of a UE, whether the UE indicates/identifies that it is a RedCap UE, e.g., in Msg1, Msg3 or MsgA (according to Path B). If the gNB does not detect any indication/identification from the UE during the early detection (according to Path B), the gNB may detect the UE according to Path A (block 714), i.e., the gNB detects the RedCap UE after the RACH procedure. If the gNB detects indication/identification from the UE during the early detection, the gNB may apply coverage recovery means to communicate with the UE (block 716). As an example, if the UE indicates in Msg1, the gNB may apply coverage recovery means for all DL transmissions to the UE after receiving Msg1 during the RACH procedure. If the UE indicates in Msg3, the gNB may apply coverage recovery means for all DL transmissions to the UE after receiving Msg3 during the RACH procedure. If the UE indicates in MsgA, coverage recovery means may be applied for transmitting MsgB to the UE. The UE may apply received coverage recovery techniques to receive these DL transmissions. In the uplink, the UE may repeat transmission of a message during the RA procedure. When both a UE and a network support Msg3 repetition, the UE may repeat transmissions of Msg3 according a configuration for repetition. Msg3 may also be retransmitted based on a HARQ procedure, which may incur a larger delay.

For FR1 TDD bands where normal UEs use 4 RX branches, 2RX RedCap UEs and 1RX RedCap UEs have different behavior from the normal UEs (e.g., due to a fewer number of branches), and thus having the 2RX UEs use the normal path may require some conservative handling on both Redcap and non-RedCap UEs. There may be differentiation between the Redcap UEs and non-RedCap UEs based on frequency bands. In this case, identification of RedCap UEs can be done in the framework described above with a criterion that takes the number of RX antennas (1, 2, or 4) as an input parameter as well as the band. Based on the indication, the network may take measures to compensate for communication with the RedCap UEs. If criterion C1 were used for FR1 TDD, a 2 Rx UE may use the normal path if conservative handling were used. This may not be the case for other bands.

In some embodiments, whether a RedCap UE operable in FR1 TDD bands identifies itself according to the normal path or the early path may be configured/indicated by a SIB configuration. As an example, a SIB configuration may be broadcasted to include a path selection criterion and parameters for use in different paths. As another example, a gNB may just add a field in a SIB to indicate which path to use (e.g., always use path B). Similarly, for RedCap UEs operable in FDD bands where 4RX is mandatory for legacy UEs, a SIB may be broadcast to indicate path configuration and path selection criterion for the UEs to determine a path.

In some embodiments, as described with C3, the instantaneous channel conditions, e.g., a channel condition represented by RSRP after antenna combining, may be considered by a UE to determine which path to use. In an embodiment, a RedCap UE may identify it as a RedCap UE using the normal path, if a channel condition is within a threshold configured for the normal path. In this way, if a RedCap UE with 2RX is in a particularly bad condition, it can access as if it were a 1RX UE, and a 1RX UE in a particularly good condition can access as if it were a 2RX UE.

In some embodiments, a criterion for RedCap UEs to select a path may be defined such that one of the 1RX RedCap UEs or 2RX RedCap UEs can select the path. The following provides such an example criterion C4:

C4: selection of Path A or Path B is based on RSRP after antenna combining for UEs having 2 RX antennas:
- a UE with 2 RX antennas and RSRP>threshold uses Path A
- a UE with 2 RX antennas and RSRP≤threshold uses Path B
- a UE with 1 RX antenna uses Path B Or:

C5: selection of Path A or Path B is based on RSRP after antenna combining for UEs having 1 RX antenna:
- a UE with 1 RX antenna and RSRP>threshold uses Path A
- a UE with 1 RX antenna and RSRP≤threshold uses Path B
- a UE with 2 RX antennas uses Path A In the above criteria (C4 and C5), the use of the threshold to choose a path is based on the RedCap UE features. One RedCap UE feature is UEs having 2 RX antennas, and the other RedCap UE feature is UEs having 1 RX antenna. For example, in C4, only 2Rx RedCap UEs are allowed to use the RSRP threshold for selecting a path, while UEs with 1Rx are not allowed to use RSRP. 1Rx UEs always use Path B, i.e., early identification.

The rationale for C4 is that it may be desirable to disallow 1RX UEs from using the normal path even they are under good channel conditions, in order to prevent too many UEs from using the normal path and the initial access resources, such as PRACH preambles. The rationale for C5 is similar. In an example, a semi-static partition of the RACH resources between Path A and Path B may be possible without having to account for each RedCap UE's individual radio conditions.

In C5, only RedCap UEs with 1Rx are allowed to use the RSRP threshold to select a path, where the UEs may be either early identified or identified at a later stage. 2Rx UEs always use Path A.

In all these example criteria above, a gNB may have RedCap UEs that satisfy different criteria and that may be identified at different stages. For example, some RedCap UEs may be identified at an early stage (early identification), while some other RedCap UEs are identified at a later stage. After identification of the RedCap UEs, by either Path A or Path B, the full capability exchange may happen at a later stage, such as at Msg5.

Figure 8:
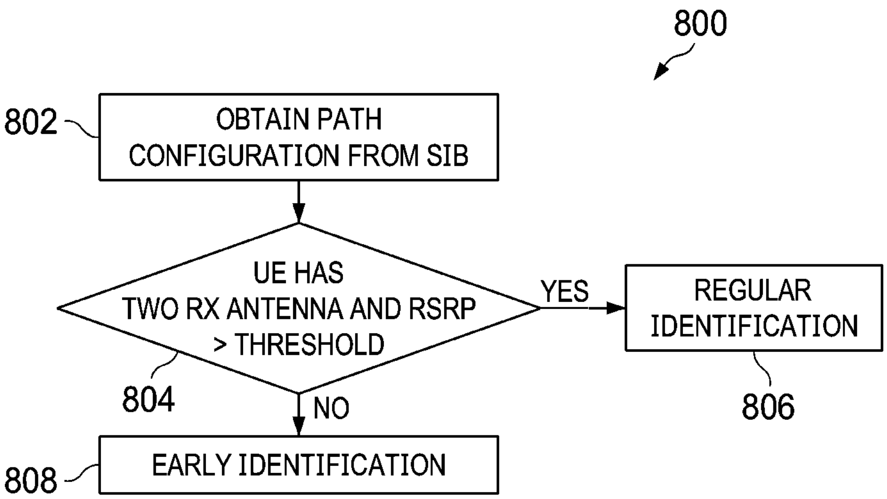
FIG. 8 is a diagram of embodiment operations for path selection based on criterion C4 for RedCap indication.

FIG. 8 is a diagram 800 illustrating embodiment operations for path selection based on criterion C4. A UE (a RedCap UE) may obtain a path configuration from a SIB (block 802). The path configuration may be similar to what is described with block 504 of FIG. 5. The UE may then check whether it has two Rx antennas and whether a RSRP measurement is greater than a threshold (block 804). When the UE has two Rx antennas and the RSRP measurement is greater than the threshold, the UE may perform regular identification (block 806), i.e., Path A. When the UE does not have two Rx antennas or the RSRP measurement is not greater than the threshold, the UE may perform early identification (block 808), i.e., Path B. This example may be combined with the example illustrated with respect to FIG. 6, where 1Rx RedCap UEs always use early identification.

In the above embodiments, two paths are described. However, it is noted that more than two paths may be defined. For example, three paths may be defined corresponding to identification through Msg1, Msg3 and Msg5, respectively. A UE may determine which of the paths to use to identify that it is a RedCap UE, e.g., based on a network configuration or a criterion. In this case, when multiple (more than two) paths are available, the selection of a path may be based on a number of different embodiments, considerations, and/or factors. For example, the selection may be:

- Threshold based (e.g. RSRP)
- UE implementation based (e.g., a UE has knowledge of its own antenna imperfections)
- Traffic based (e.g. a UE has knowledge of its subscription or other information that is normally communicated after RRC connection)

In the case where there are "high end" and "low end" wearables, a criterion for selecting a path may be based on the type of wearables. For instance, the high end wearables may use Path A, and the low end wearables may use Path B.

While the embodiments of the present disclosure are described for RedCap UEs, they are applicable to other scenarios, such as: low end smart phones, "regular" UEs requiring coverage extension, industrial sensors, etc.

The following describes embodiments of Msg5 identification (i.e., a RedCap UE identifies it as RedCap at Msg5 (during capability exchange)—Path A). The Msg5 identification may also be referred to as Msg5 path identification in the following description.

There are different paths possible for RedCap identification, one of which is the typical Msg5 after the RACH process or later exchange of UE capabilities, where a UE informs a gNB of its characteristics which can include an indication or identification that it is a RedCap UE. Besides the RedCap features, this solution does not really require any standards change. In one embodiment, RedCap UEs with 2 Rx antennas may be identified using Msg5 path identification. In another embodiment, RedCap UEs with 1 Rx antenna but with very strong channel gain conditions (e.g., RSRP greater than a RSRP threshold) may also use the Msg5 path identification. This path of identification may be combined with other path of identification through Msg1 or Msg3 as explained later in the disclosure.

The following describes embodiments of Msg1 identification (i.e., a RedCap UE identifies it as RedCap at Msg1 (during a RACH process)—Path B). As discussed above, one possible way of identifying a RedCap UE is through early path identification, such as during Msg1 transmission by RedCap UEs. Configuration for this path may be provided in a SIB. For example, identification in Msg1 may be possible via providing (such as by configuration information, by specifying standard specification, or in SIB) PRACH preambles or occasions in time or frequency that are associated with RedCap UEs. These may be in the same initial BWP or a separate initial BWP. The early path identification may be performed in an initial UL BWP the same as or separate from an initial UL BWP used for the normal identification. Information about the initial BWPs may be broadcast in SIBs. There may be different RACH configuration associated with different initial UL BWPs.

In an example, a PRACH configuration may be broadcast in a SIB, where the PRACH configuration includes information used for identifying a RedCap UE using Path B. As an example, the PRACH configuration may include information of a PRACH preamble, a RACH occasion, or a combination thereof, which is associated with indicating/identifying RedCap UEs. Other messages during a RACH process, e.g., Msg3, or MsgA, may also be used for early identification of a RedCap UE, as discussed above. Which of the Msg1, Msg3, or MsgA is to be used for early identification may be configured by a radio resource control (RRC) configuration. The RRC configuration may be broadcast by a gNB.

Upon receiving the SIB, a UE would have the knowledge of the PRACH configuration and transmission parameters, such as one or more of following:

- a PRACH preamble format,
- time-frequency resources,
- parameters for determining the root sequences,
- a cyclic shift in the PRACH preamble sequence set, or
- an index to the logical root sequence table, associate set type that is unrestricted, restricted Type A or Type B.

For normal NR UEs, the time-domain location for the PRACH preamble is determined by the RRC parameter prach-ConfigurationIndex, and the frequency domain resource for the PRACH preamble is determined by the RRC parameter msg1-FDM and msg1-FrequencyStart, according to TS 38.331, v16.2.0.

In one embodiment, RedCap UEs using early path identification (for example, RedCap UEs with 1 Rx or RedCap UEs with 2 Rx but with RSRP<threshold) may have a PRACH configuration (also referred to as RACH configuration) information element, e.g., RACH-ConfigGeneric-RedCap information element, separate from the normal UEs, where the RACH configuration information element specifies RedCap random-access parameters, as indicated by a suffix. In this information element, the frequency and time resources may be indicated by parameters prach-ConfigurationIndex-redcap, msg1-FDM-redcap and msg1-FrequencyStart-redcap. Other configurations naming may include v17 and/or an abbreviation rc (RedCap) and are not limited to the aforementioned examples. The RedCap UE PRACH (or RACH) configurations are not limited to the time, frequency locations, but may also include a periodicity of resources, a subcarrier offset, a number of subcarriers, the maximum number of preamble transmissions and power ramping steps, starting slot numbers, a number of slots, and so on. Thus, RedCap UEs may receive separate configurations than normal UEs for early identification, or RedCap UEs may use a later stage for identification as normal UEs do.

In another embodiment, the same RACH-ConfigGeneric information element may include PRACH configurations for both RedCap UEs identifying at later stage (through Msg5) and RedCap UEs identifying at early stage (e.g., through Msg1). In another embodiment, PRACH resources may be non-overlapping for different types of RedCap UEs that are to be identified at different stages, in which case, there may be information elements for the different types of UEs defined for configuring indication of RedCap UEs.

In another embodiment, a gNB may indicate that RedCap UEs with 2 Rx (that may not require coverage compensation) may use a legacy PRACH configuration while RedCap UEs with 1 Rx may use a different PRACH configuration. In yet another embodiment, the resources for RedCap UEs—that are to be identified at early stage—may be specified in terms of an offset from resources configured for the normal UEs. The offset may be in terms of a time-frequency resource offset. It is noted that the separate configurations are not limited to the time-frequency resource location configurations, but may include all other configurations that are related to the RACH procedure, such as different preambles.

An example embodiment of a configuration IE is provided below in Table 8. In this example, separate generic PRACH resources are configured (in italic) for RedCap UEs that perform early identification. RedCap UEs do not use the PRACH configuration for normal UEs but use a separate PRACH configuration.

Having identified the RedCap UE PRACH resources via the PRACH configuration, a UE may transmit a PRACH preamble (random access preamble) accordingly to a gNB (in a PRACH occasion). The gNB may calculate the RA-RNTI associated with a RACH occasion (RO), in which the random access preamble is transmitted, and the parameters used to calculate the RA-RNTI may include the time and frequency resources over which the preamble is transmitted, as indicated by the prach-ConfigurationIndex-redcap, msg1-FDM-redcap and msg1-FrequencyStart-redcap. Since RedCap UEs may require that the preamble be transmitted a number of times (e.g., for uplink coverage enhancement), a configuration that includes the maximum number of repetitions allowed may be configured for the Redcap UEs, e.g., in a SIB. The number may be related to a coverage enhancement level.

In the second step of a RACH process (in reference to FIG. 2), following the PRACH preamble transmission, the UE awaits a random access response from the gNB. The

TABLE 8

```
RACH-ConfigGeneric ::=                    SEQUENCE {
  rsrp-ThresholdsPrachInfoList-r17
  prach-ConfigurationIndex                  INTEGER (0..255),
  msg1-FDM                                ENUMERATED {one, two, four, eight},
  msg1-FrequencyStart                       INTEGER (0..maxNrofPhysicalResourceBlocks-1),
  zeroCorrelationZoneConfig                 INTEGER(0..15),
  preambleReceivedTargetPower                 INTEGER (−202..−60),
  preambleTransMax                          ENUMERATED {n3, n4, n5, n6, n7, n8, n10, n20, n50, n100,
n200},
  powerRampingStep                          ENUMERATED {dB0, dB2, dB4, dB6},
  ra-ResponseWindow                          ENUMERATED {sl1, sl2, sl4, sl8, sl10, sl20, sl40, sl80},
  ...,
  [[
  prach-ConfigurationPeriodScaling-IAB-r16            ENUMERATED
{scf1,scf2,scf4,scf8,scf16,scf32,scf64}                 OPTIONAL, -- Need R
  prach-ConfigurationFrameOffset-IAB-r16             INTEGER (0..63)
OPTIONAL, -- Need R
  prach-ConfigurationSOffset-IAB-r16               INTEGER (0..39)
OPTIONAL, -- Need R
  ra-ResponseWindow-v1610                        ENUMERATED { sl60, sl160}
OPTIONAL, -- Need R
  prach-ConfigurationIndex-v1610                   INTEGER (256..262)
OPTIONAL -- Need R
  ]]
prach-ConfigurationIndex-redcap                   INTEGER (0..255),
  msg1-FDM-redcap                             ENUMERATED {one, two, four, eight},
  msg1-FrequencyStart-redcap                      INTEGER (0..maxNrofPhysicalResourceBlocks-1),
}
```

In another embodiment, a threshold is defined if a RedCap UE is to use an early identification path based on a criterion using a threshold (such as C3, C4, C5). In one embodiment, the threshold may be defined using rsrp-ThresholdsPrachInfoList-r17 IE Different coverage levels may be defined based on RSRP and defined in an information element. The RACH-ConfigGeneric IE may be augmented to include the rsrp-ThresholdsPrachInfoList-r17 IE. In another embodiment, the RACH-ConfigCommon IE may be augmented to include the rsrp-ThresholdsPrachInfoList-r17 IE.

In another embodiment, the network may also configure a set of preambles that are specifically to be used by RedCap UEs that are to be identified at Msg1. These preambles may have different properties than preambles configured for normal UEs. A property that can be different may include one or more of a type of sequence, a cyclic shift, and so on.

Different groups of preambles may be defined. In one embodiment, two groups of preambles are defined, with one group configured for UEs that are to be early identified and the other group configured for UEs that are to be later identified, with or without using a threshold.

random access response (RAR) may be sent through a DCI scrambled with the RA-RNTI value. The UE may attempt to detect a PDCCH (i.e., the DCI) with the corresponding RA-RNTI within a period of ra-ResponseWindow. In another embodiment, RedCap UEs with 1 Rx (or RedCap with 2Rx and with bad channel gain conditions (e.g., RSRP less than a threshold)) may be configured with a separate period ra-ResponseWindow-redcap from normal UEs, for monitoring the DCI.

While the criteria for path selection may be configured using configuration received in the SIB, as described above, a criterion may also be captured in the technical specification. For example, the specification can state that a 2 Rx branch RedCap UE operating in a certain band that supports a minimum of 2 Rx branches for non-RedCap UEs can identify itself using Path A, and a 1 Rx RedCap UEs can identify itself using Path B. Moreover, the use of Path A by the 2 Rx RedCap UEs may further be determined based on whether some RAN4 performance requirements are met. As an example, a 2 RX UE having a very small form factor and poor receive performance due to antenna correlations may use Path B.

If a UE performs early identification using Msg1, in some embodiments, the following may be considered for other steps in the 4-step random access procedure, as examples.

In some examples, to receive Msg 2 (or Msg2), the UE may receive an associated PDCCH (associated with Msg2) using downlink coverage enhancement techniques (or downlink performance compensation technique) for the associated PDCCH. The following may be considered:

- If there is a dedicated PDCCH for early identification
  - The UE can receive a PDSCH carrying Msg2 through one or more coverage enhancement techniques, which may be signaled via a DCI within the PDCCH
    - The downlink coverage enhancement technique may include, e.g., TB scaling, repetition, and/or lower MCS levels
    - Note that the timing for RACH (e.g. Msg3 transmission) may change when coverage enhancement is applied
- If there is no dedicated PDCCH for early identification
  - The UE can receive the PDSCH using one or more downlink coverage enhancement techniques provided by a SIB configuration
    - Note that the timing for RACH may change when downlink coverage enhancement is applied In some examples, to transmit Msg 3 (or Msg3) when early identification is performed at Msg1, some options may include:

- No changes to the RAR UL grant, i.e., use the UL grant received in the RAR for transmission of Msg3
- Modify the RAR UL grant (e.g. by using TB scaling, different MCS levels, and/or repetition)
- Use SIB configuration to augment the RAR UL grant (e.g., performing uplink coverage enhancement, such as Msg3 repetition based on SIB configuration)

In some examples, to receive Msg 4 (or Msg4) when early identification is performed at Msg1, a base station (e.g., gNB) may reuse the techniques for sending the Msg2 PDCCH for scheduling Msg4. Since the base station has a better understanding of the UE (the UE identifies it as the RedCap UE at Msg1), it can use configured parameters for the transmission of the PDCCH for Msg4. Note at this point, the base station may use a temporary RNTI dedicated for that UE and not the RA-RNTI. The signaling is now "mostly" dedicated, and PDSCH scheduling may be more tailored for that UE, as the temporary RNTI is dedicated for that specific UE.

The following describes embodiments of Msg3 identification (i.e., a RedCap UE identifies it as RedCap at Msg3 (during a RACH process)—Path B). As discussed above, Msg3 may also be used for early identification of a RedCap UE. If RedCap UEs have worse performance than normal UEs, this early identification allows the RedCap UEs and the normal UEs to be treated differently, as opposed to having to treat all of the UEs (both RedCap and normal) conservatively due to the possible presence of RedCap UEs.

In one embodiment, one or more bits in Msg3 may be used to identify a RedCap UE that is going through early identification path. In a NR RACH process, RACH-ConfigCommon is used to configure Msg3 related parameters, such as the transform precoder in RACH-ConfigCommon. In one embodiment, one bit in Msg3 may be used to explicitly identify a UE as a RedCap UE. In another embodiment, if the Msg3 size exceeds a certain threshold, a bit of another field of the Msg3, such as the transform precoder field, may be used to identify the UE as a RedCap UE. Table 9 below shows an example RACH-ConfigCommon IE including an msg3-transformPrecoder (msg3-transformPrecoder, in italic).

TABLE 9

```
-- ASN1START
-- TAG-RACH-CONFIGCOMMON-START
RACH-ConfigCommon ::=                    SEQUENCE {
  rach-ConfigGeneric                     RACH-ConfigGeneric,
  totalNumberOfRA-Preambles                  INTEGER (1..63)
OPTIONAL, -- Need S
  ssb-perRACH-OccasionAndCB-PreamblesPerSSB CHOICE {
    oneEighth                              ENUMERATED
{n4,n8,n12,n16,n20,n24,n28,n32,n36,n40,n44,n48,n52,n56,n60,n64},
    oneFourth                              ENUMERATED
{n4,n8,n12,n16,n20,n24,n28,n32,n36,n40,n44,n48,n52,n56,n60,n64},
    oneHalf                               ENUMERATED
{n4,n8,n12,n16,n20,n24,n28,n32,n36,n40,n44,n48,n52,n56,n60,n64},
    one                                  ENUMERATED
{n4,n8,n12,n16,n20,n24,n28,n32,n36,n40,n44,n48,n52,n56,n60,n64},
    two                                  ENUMERATED {n4,n8,n12,n16,n20,n24,n28,n32},
    four                                 INTEGER (1..16),
    eight                                INTEGER (1..8),
    sixteen                               INTEGER (1..4)
  }                                                  OPTIONAL, -- Need M
  groupBconfigured                       SEQUENCE {
    ra-Msg3SizeGroupA                       ENUMERATED {b56, b144, b208, b256, b282, b480,
b640,
                                         b800, b1000, b72, spare6, spare5,spare4, spare3, spare2,
spare1},
    messagePowerOffsetGroupB                 ENUMERATED { minusinfinity, dB0, dB5, dB8,
dB10, dB12, dB15, dB18},
    numberOfRA-PreamblesGroupA                 INTEGER (1..64)
  }                                                  OPTIONAL, -- Need R
  ra-ContentionResolutionTimer               ENUMERATED { sf8, sf16, sf24, sf32, sf40, sf48,
sf56, sf64},
  rsrp-ThresholdSSB                        RSRP-Range                OPTIONAL, --
Need R
  rsrp-ThresholdSSB-SUL                     RSRP-Range                OPTIONAL,
-- Cond SUL
```

TABLE 9-continued

```
  prach-RootSequenceIndex                CHOICE {
     l839                         INTEGER (0..837),
     l139                         INTEGER (0..137)
  },
  msg1-SubcarrierSpacing               SubcarrierSpacing             OPTIONAL,
-- Cond L139
  restrictedSetConfig                ENUMERATED {unrestrictedSet, restrictedSetTypeA,
restrictedSetTypeB},
  msg3-transformPrecoder               ENUMERATED {enabled}
OPTIONAL, -- Need R
  ...,
  [[
  ra-PrioritizationForAccessIdentity         SEQUENCE {
     ra-Prioritization-r16             RA-Prioritization,
     ra-PrioritizationForAI-r16           BIT STRING (SIZE (2))
  }                              OPTIONAL, -- Cond InitialBWP-
Only
  prach-RootSequenceIndex-r16            CHOICE {
     l571                         INTEGER (0..569),
     l1151                        INTEGER (0..1149)
  } OPTIONAL -- Need R
  ]]
}
-- TAG-RACH-CONFIGCOMMON-STOP
-- ASN1STOP
```

In one embodiment, a separate information element whose functionality is similar to RACH-ConfigCommon functionality but with different values configured for RedCap UEs may be used for RedCap configuration purposes, providing configuration information for RedCap UEs that are to be identified at the early stage.

A gNB receives the Msg3, and is thus able to identify a RedCap UE based on the Msg3 and the used configurations. Msg3 may be sent by the UE using a coverage recovery technique. Having the knowledge that Msg3 is transmitted with the coverage recovery technique, the gNB is able to correctly detect the Msg3 and is further able to transmit Msg4 for the RedCap UE with a downlink coverage recovery technique, such as repeating Msg4 several times and/or using a lower MCS value, or TB scaling.

The following describes coverage enhancement (CE).

Msg3 repetition is an optional feature for non-RedCap UEs. Conventionally, Msg3 repetition may be used to provide uplink coverage enhancement for transmitting Msg3 by non-RedCap UEs. The Msg3 may be transmitted repetitively (multiple times) by a UE during a RACH process. Msg3 repetition may be referred to as a "CE feature" in the following. A gNB may configure RACH occasion (RO) and/or preambles that a non-RedCap UE may use to perform Msg3 repetition. In an example, a non-RedCap may perform Msg3 repetition for coverage enhancement if the measured RSRP is less than a threshold.

Early indication may be configured by a gNB as a mandatory feature/capability for RedCap UEs. In this case, it is mandatory for RedCap UEs to identify themselves as RedCap UEs at the early stage (Path B) during a RACH process, e.g., at Msg1, Msg3 or MsgA. Early indication may be used or configured for RedCap UEs when a size of a non-RedCap UL BWP is the same as or larger than a size of a RedCap UE UL BWP. A main reason to use the early indication in this case is for providing more efficient resource allocation (or valid size BWP) during a RA process, for both RedCap and the non-RedCap UEs (where non-RedCap UEs may use wider BWP during the RA process).

Msg3 repetition may also be available to RedCap UEs (per the WID) with small modifications possible if needed. The feature (Msg3 repetition) may be optional for RedCap UEs, even if it is likely useful for all RedCap UEs. For applying Msg3 repetition, a UE may need to use an appropriate RACH resource for transmitting Msg1. In an example, Msg1 may be used to indicate that the UE is a RedCap UE (early indication). Msg1 may also be used to indicate that this CE feature will be applied (or Msg3 repetition is to be performed). In another example, Msg1 may be repeated and Msg3 may be used for RedCap early indication.

A gNB, if it wishes to support this CE feature (Msg3 repetition) for all UE types (non-RedCap UEs and RedCap UEs), may need to split preambles/ROs into four groups/regions: (RedCap, non-RedCap)×(Msg3 repetition, no Msg3 repetition) (see Table 10 below).

TABLE 10

| UE type | No Msg3 repetition | Msg3 repetition |
|---|---|---|
| RedCap | RACH1 | RACH2 |
| Non-RedCap | RACH3 | RACH4 |

In Table 10 above, RACHi represents the ith RACH configuration, and each RACH configuration may include one or more preambles, one or more ROs, or a combination thereof. The number of groups/regions is the number of RACH configurations. Each RACH configuration provides configuration for transmission of Msg1. According to Table 10, four RACH configurations may be configured, i.e., RACH1-RACH4, respectively corresponding to four different feature combinations of UEs: RedCap UEs with no Msg3 repetition, RedCap UEs with Msg3 repetition, non-RedCap UEs with no Msg3 repetition, and non-RedCap UEs with Msg3 repetition.

However, how to partition resources may be too much to require UEs to do, so rules may need to be defined for UEs to determine which RACH configuration is to be used. Another issue is that the number of preambles and RACH resources is limited.

In a first embodiment, when no early indication is configured for RedCap UEs, both RedCap and non-RedCap UEs may use a CE feature-defined RO/preamble with a threshold. That is, when the threshold is satisfied (e.g., RSRP<threshold), both the RedCap and non-RedCap UEs may perform Msg3 coverage enhancement using the defined RO/preamble. The same threshold may be used for RedCap and non-RedCap UEs, or a separate threshold may be used for RedCap UEs (e.g., if needed to account, for example, for the complexity reduction features). As an example, a UE (either a RedCap or a non-RedCap) may perform Msg3 repetition when a RSRP measurement is less than a threshold. As another example, a threshold 1 is configured for non-RedCap UEs, and a threshold 2 is configured for RedCap UEs. In this case, a non-RedCap UE may perform Msg3 repetition when a RSRP measurement is less than the threshold 1, and a RedCap UE may perform Msg3 repetition when a RSRP measurement is less than the threshold 2. Table 11 below shows the RACH configurations of the first embodiment. As shown, two RACH configurations, RACH1 and RACH2, are needed corresponding to two categories: UEs with no Msg3 repetition and UEs with Msg3 repetition. When a UE's RSRP measurement is greater than a threshold, the UE transmits Msg1 according to RACH1 without performing Msg3 repetition. When a UE's RSRP measurement is less than the threshold, the UE transmits Msg1 according to RACH2 and performs Msg3 repetition.

TABLE 11

| UE type | No Msg3 repetition | Msg3 repetition |
|---|---|---|
| RedCap | RACH1 | RACH2 |
| Non-RedCap | RACH1 | RACH2 |

In some embodiments, a RedCap UE with certain characteristics (e.g., Redcap UEs having 1Rx branch (or 2Rx branches) in bands that require 4Rx branches for non-RedCap UEs) may be assigned to the non-repetition region (e.g., RedCap UEs with 2RX) (i.e., RACH1 in Table 11), or to the repetition region (e.g., RedCap UEs with 1 Rx branch) (i.e., RACH2 in Table 11).

Combinations of UE features and thresholds may also be used. For example, RedCap UEs with 2 Rx branches and RSRP above a threshold and non-RedCap UEs may use a normal RO (i.e., RACH), or, RedCap UEs with 1 Rx branch and RSRP below a threshold may use a CE RO (i.e., RACH2 in Table 11). Use of the repetition region (for Msg3) (i.e., RACH2 in Table 11) would require support of the CE feature by the UEs.

Note, if this CE feature (Msg3 repetition) is mandatory for RedCap UEs, it may be seen as similar to a form of early indication, though not uniquely so. For example, if Msg3 repetition is mandatory for RedCap UEs, the network knows that RedCap UEs support Msg3 repetition, and a RedCap UE knows that it can use Msg3 repetition (if a condition is satisfied, e.g., as shown in Tables 10 and 11). Further, the number of repetitions used in Msg3 may be used by the network to distinguish RedCap UEs and non-RedCap UEs. A Msg1 resource indicating CE may be requested by either a RedCap or a non-RedCap UE. If the number of repetitions is unique for a RedCap UE and a non-RedCap UE as well, a base station may count the number repetitions of Msg3 received to identify whether the message is from a RedCap or non-RedCap UE. If the number of repetitions is not unique, the base station cannot use the number of repetitions to distinguish RedCap UEs and non-RedCap UEs. As an example, it is possible that non-RedCap UEs can use {1,2} repetitions while RedCap UEs use {4} repetitions to provide a form of early indication. The notation {x} is the allowed number of repetitions of Msg3. If there is a common value for the number of repetitions between for non-RedCap UEs and RedCap UEs, e.g., {1,2} is configured for non-RedCap UEs and {2,4} is configured for RedCap UEs, it may not be possible to distinguish the UE types when two (2) Msg3 repetitions are received at the base station. That is, the base station may not know whether the 2 Msg3 repetitions are sent by a RedCap UE or a non-RedCap UE There may not be a separate UL BWP for RedCap UEs configured. For example, both types of UEs (RedCap and non-RedCap) share the same UL BWP, under the constraints of the UL BWP for RedCap UEs—e.g., bandwidth, location.

In a second embodiment, both early indication and the Msg3 repetition features may be configured for RedCap UEs, with non-RedCap and RedCap UEs using the same region (same RACH configuration) for Msg3 repetition (thus, there are 3 regions (RACH1-3) in this example). Table 12 below shows RACH configurations of the second embodiment. When Msg3 repetition is used, both non-RedCap and RedCap UEs transmit Msg1 according to RACH2. When no Msg3 repetition is used, RedCap UEs transmit Msg1 according to RACH1, and non-RedCap UEs transmit Msg3 according to RACH3.

TABLE 12

| UE type | No Msg3 repetition | Msg3 repetition |
|---|---|---|
| RedCap | RACH1 | RACH2 |
| Non-RedCap | RACH3 | RACH2 |

In this example, a non-RedCap UE may transmit Msg3 repetitions in the same UL BWP as a RedCap UL BWP, even though it weakens the uniqueness of early indication because the RedCap and non-RedCap UEs use the "same RACH configuration" (e.g., poor channel conditions because the RSRP is less than a threshold). The non-RedCap UE may still transmit the Msg3 efficiently. Similar to the first embodiment described above, thresholds used to determine whether to perform Msg3 repetition can be different for RedCap UEs and for non-RedCap UEs. Using the number of repetitions to distinguish RedCap UEs of different feature(s) (e.g., RedCap UE with one Rx branch always uses repetitions) is not possible since embodiment 2 simplifies to embodiment 1 in that case. One limitation with this embodiment is that the RedCap and non-RedCap UEs share the same initial UL BWP during initial access because the same RACH configuration (RACH2) is used by RedCap and non-RedCap UEs. Thus, there may not be separate BWPs for RedCap and non-RedCap UEs with repetition.

In a third embodiment, both early indication and the Msg3 repetition CE feature may be configured for RedCap UEs, with non-RedCap and RedCap UEs using the same non-repetition region (RACH configuration) when no Msg3 repetition is performed but using different regions (different RACH configurations) for repetition (thus, there are 3 regions in total for this example). Table 12 below shows RACH configurations according to the third embodiment. When no Msg3 repetition is used, both non-RedCap and RedCap UEs transmit Msg1 according to RACH1. When Msg3 repetition is used, RedCap UEs transmit Msg1 according to RACH2, and non-RedCap UEs transmit Msg1 according to RACH4.

TABLE 13

| UE type | No Msg3 repetition | Msg3 repetition |
|---|---|---|
| RedCap | RACH1 | RACH2 |
| Non-RedCap | RACH1 | RACH4 |

The third embodiment may be less attractive, e.g., a non-RedCap UE in good conditions (e.g., with RSRP above a threshold and thus no Msg3 repetition is used) must follow a RedCap BW restriction (same RACH1). Also, if a RedCap UE does not support this CE feature of Msg3 repetition, then it would be treated similarly as a non-RedCap UE according to the "same RACH configuration" regardless of its condition relative to a threshold or features supported. Same embodiments, e.g., thresholds, as described in the first embodiment may apply. Potentially this solution may allow for different numbers of repetitions (repetitions of 1, 2,4 supported, and possibly 8) for RedCap and non-RedCap UEs, as early indication may be performed by RedCap UEs. This is reasonable as a RedCap UE has fewer branches, the number of repetitions allowed for RedCap UEs may be greater than the number of repetitions configured for non-RedCap UEs. This may also be considered more attractive if separate BWPs for CE are used for RedCap and non-RedCap UEs for Msg3 transmission during initial access.

In a fourth embodiment, only RedCap UEs may be allowed to use the CE feature (thus, there may be two or three regions). The fourth embodiment may be similar to the second embodiment with three regions, if early indication is on (configured for RedCap UEs) and either a) the CE feature is only signaled for RedCap UEs, or b) the threshold for CE is set to a value such that the CE feature is turned off for non-RedCap UEs and there is a separate RedCap threshold for RedCap UEs from non-RedCap UEs. Table 14 below shows RACH configurations according to the fourth embodiment, where Msg3 repetition is generally turned off for non-RedCap UEs with an appropriate value of a threshold. When no Msg3 repetition is used, RedCap UEs transmit Msg1 according to RACH1, and non-RedCap UEs transmit Msg1 according to RACH3. When Msg3 repetition is used, RedCap UEs transmit Msg1 according to RACH2. The non-RedCap UEs may be configured with a very low threshold such that Msg3 repetition is not performed by the non-RedCap UEs, and non-RedCap UEs transmit Msg1 according to RACH3. RedCap UEs are configured with a threshold (for performing Msg3 repetition) that is different from the threshold configured for the non-RedCap UEs. With three regions configured, there is no issue with using separate BWPs for RedCap UEs (early indication is supported). Non-RedCap UEs do not use CE (or the network decides not to support CE for non-RedCap UEs).

TABLE 14

| UE type | No Msg3 repetition | Msg3 repetition |
|---|---|---|
| RedCap | RACH1 | RACH2 |
| Non-RedCap | RACH3 | b) RACH3 (with very low threshold) |

If there is no early indication configured for RedCap UEs, then there will be two regions (RACH configurations). This example may be similar to the first embodiment, if a) the CE feature is only signaled for RedCap UEs, or b) the threshold for CE is set to a value such that the CE feature is turned off for non-RedCap UEs and there is a separate RedCap threshold from non-RedCap UEs. This example is shown in Table 15 below. When no Msg3 repetition is used, RedCap UEs and non-RedCap UEs transmit Msg1 according to RACH1. When Msg3 repetition is used, RedCap UEs transmit Msg1 according to RACH2. The non-RedCap UEs may be configured with a very low threshold such that Msg3 repetition is not performed by the non-RedCap UEs, and consequently, the non-RedCap UEs transmit Msg1 according to RACH1. RedCap UEs are configured with a threshold (for performing Msg3 repetition) that is different from the threshold configured for the non-RedCap UEs.

TABLE 15

| UE type | No Msg3 repetition | Msg3 repetition |
|---|---|---|
| RedCap | RACH1 | RACH2 |
| Non-RedCap | RACH1 | b) RACH2 (with very low threshold) |

FIG. 9 is a flow diagram of an embodiment method 900 for RedCap UE indication. The method 900 may be indicative of operations of a UE. The UE may determine, based on a criterion, whether to indicate, to a gNB, that it is a reduced capability (RedCap) UE during a random access (RA) procedure of the UE or after the RA procedure (block 902). The RedCap UE has a quantity of receive branches less than a minimum number of receive branches of a non-RedCap UE, or has a bandwidth less than a minimum bandwidth of the non-RedCap UE The UE may indicate, to the gNB, that it is the RedCap UE according to a determination result (block 904). The non-RedCap UE may be a legacy UE.

Figure 10:
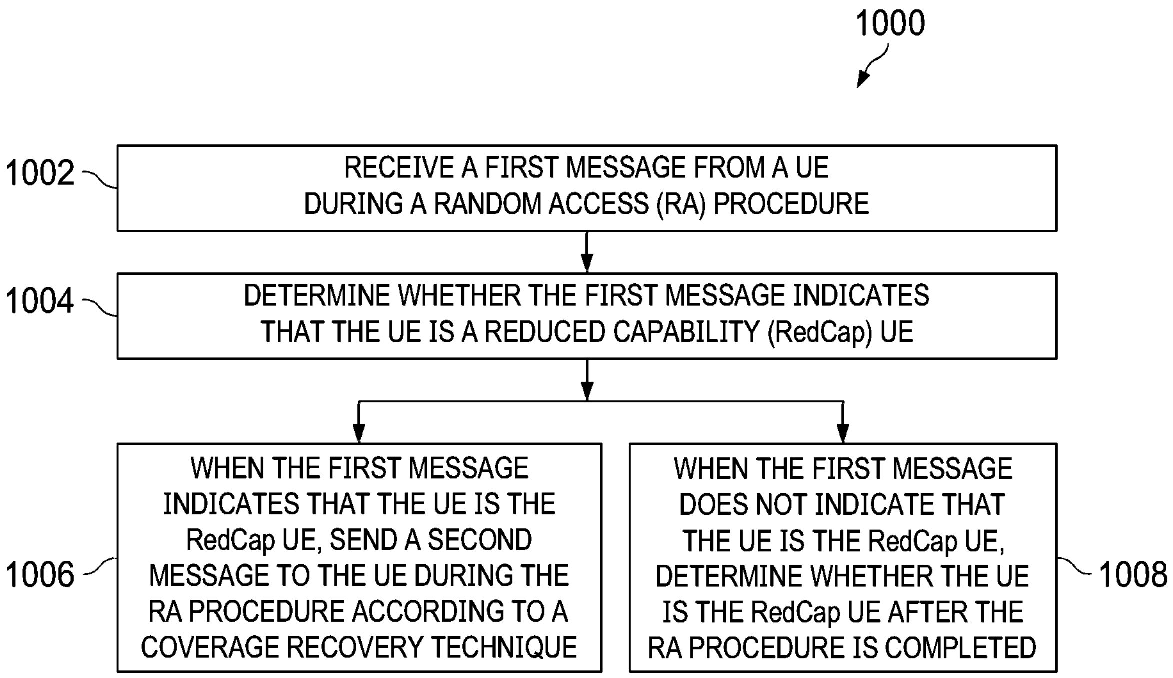
FIG. 10 is a diagram of another embodiment RedCap UE detection method.

FIG. 10 is a flow diagram of another embodiment method 1000 for RedCap UE detection. The method 1000 may be indicative of operations of a gNB. The gNB may receive a first message from a UE during a random access (RA) procedure (block 1002). The gNB May determine whether the first message indicates that the UE is a reduced capability (RedCap) UE (block 1004). The RedCap UE has a quantity of receive branches less than a minimum number of receive branches of a non-RedCap UE, or has a bandwidth less than a minimum bandwidth of the non-RedCap UE. When the first message indicates that the UE is the RedCap UE, the gNB may send a second message to the UE during the RA procedure according to a coverage recovery technique (block 1006). When the first message does not indicate that the UE is the RedCap UE, the gNB may determine whether the UE is the RedCap UE after the RA procedure is completed (block 1008).

Figure 11:
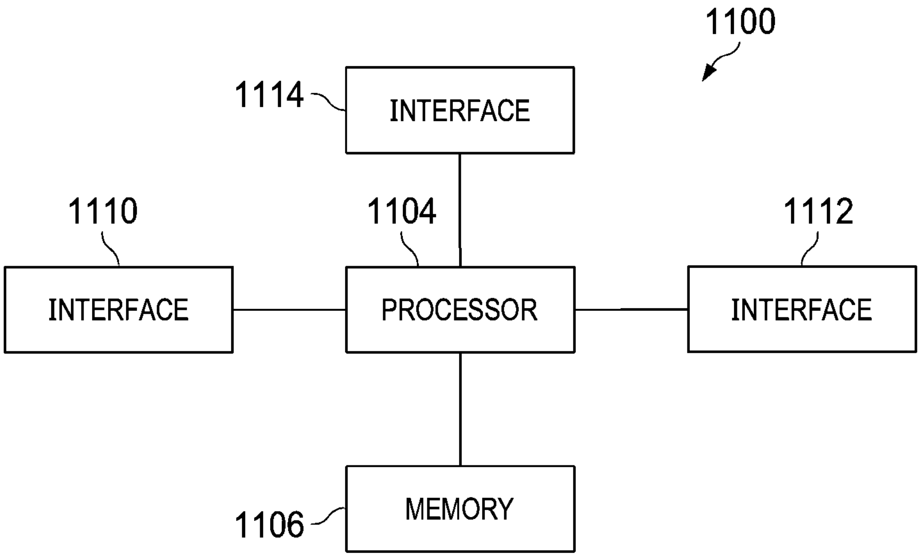
FIG. 11 is a block diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1101 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1101. The processing system 1101 may include additional components not depicted in FIG. 11, such as long term storage (e.g., non-volatile memory, etc.).

In some embodiments, the processing system 1101 is included in a network device that is accessing, or part otherwise of, a telecommunications network. In one example, the processing system 1101 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
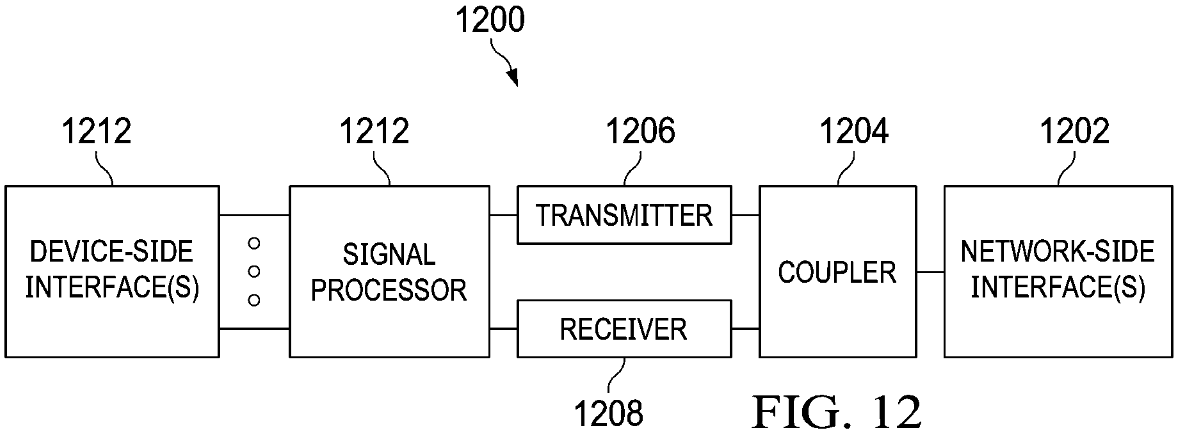
FIG. 12 illustrates a block diagram of a transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1101, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 13:
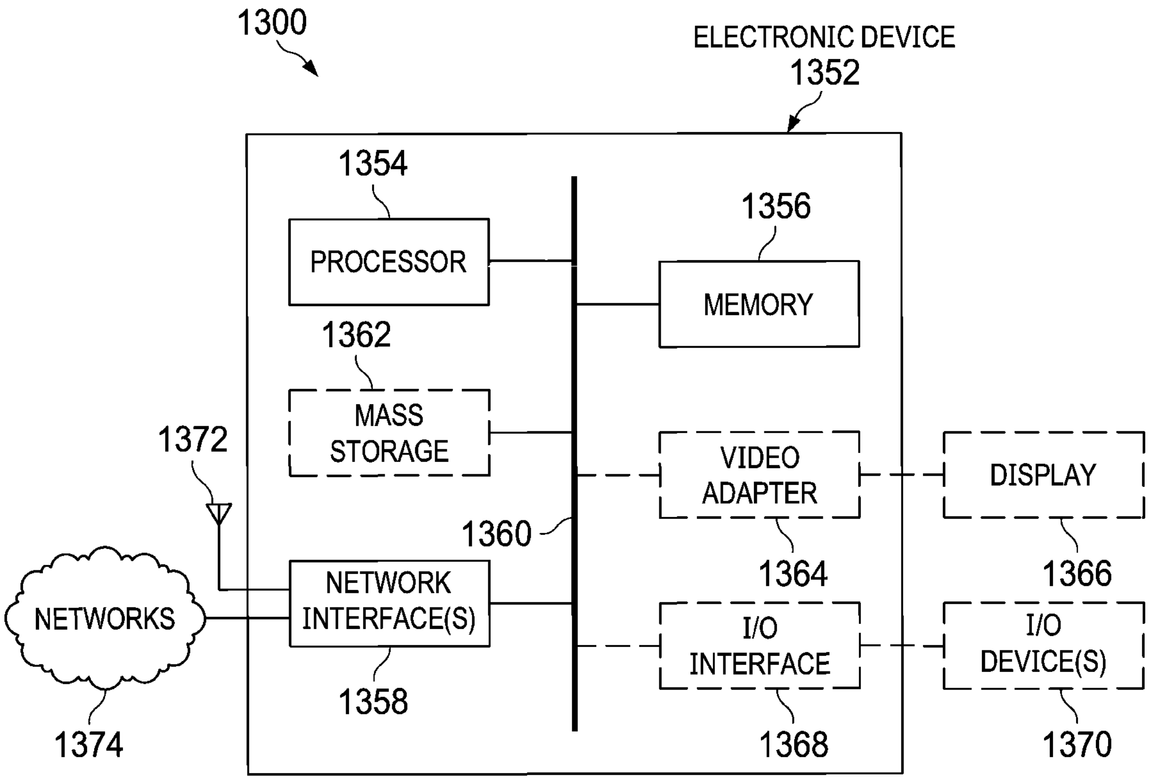
FIG. 13 is a block diagram of an electronic device.

FIG. 13 is a block diagram of an electronic device (ED) 1352 illustrated within a computing and communications environment 1300 that may be used for implementing the devices and methods disclosed herein. Examples of an ED include a UE, tablet, IoT device, computer, or other device with wireless communication capabilities.

In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device may be a device that connects to the network infrastructure over a radio interface, such as a mobile phone, smart phone or other such device that may be classified as a User Equipment (UE). In some embodiments, ED 1352 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. ED 1352 typically includes a processor 1354, such as a Central Processing Unit (CPU), and may further include specialized processors such as a Graphics Processing Unit (GPU) or other such processor, a memory 1356, a network interface 1358 and a bus 1360 to connect the components of ED 1352. ED 1352 may optionally also include components such as a mass storage device 1362, a video adapter 1364, and an I/O interface 1368 (shown in dashed lines).

The memory 1356 may comprise any type of non-transitory system memory, readable by the processor 1354, such as static random access memory (SRAM), dynamic random access memory (DRAM), synchronous DRAM (SDRAM), read-only memory (ROM), or a combination thereof. In an embodiment, the memory 1356 may include more than one type of memory, such as ROM for use at boot-up, and DRAM for program and data storage for use while executing programs. The bus 1360 may be one or more of any type of several bus architectures including a memory bus or memory controller, a peripheral bus, or a video bus.

The electronic device 1352 may also include one or more network interfaces 1358, which may include at least one of a wired network interface and a wireless network interface. As illustrated in FIG. 13, network interface 1358 may include a wired network interface to connect to a network

1374, and also may include a radio access network interface 1372 for connecting to other devices over a radio link. When ED 1352 is a network infrastructure element, the radio access network interface 1372 may be omitted for nodes or functions acting as elements of the PLMN other than those at the radio edge (e.g. an eNB). When ED 1352 is infrastructure at the radio edge of a network, both wired and wireless network interfaces may be included. When ED 1352 is a wirelessly connected device, such as a User Equipment, radio access network interface 1372 may be present and it may be supplemented by other wireless interfaces such as WiFi network interfaces. The network interfaces 1358 allow the ED 1352 to communicate with remote entities such as those connected to network 1374.

The mass storage 1362 may comprise any type of non-transitory storage device configured to store data, programs, and other information and to make the data, programs, and other information accessible via the bus 1360. The mass storage 1362 may comprise, for example, one or more of a solid state drive, hard disk drive, a magnetic disk drive, or an optical disk drive. In some embodiments, mass storage 1362 may be remote to the electronic device 1352 and accessible through use of a network interface such as interface 1358. In the illustrated embodiment, mass storage 1362 is distinct from memory 1356 where it is included, and may generally perform storage tasks compatible with higher latency, but may generally provide lesser or no volatility. In some embodiments, mass storage 1362 may be integrated with a heterogeneous memory 1356.

The optional video adapter 1364 and the I/O interface 1368 (shown in dashed lines) provide interfaces to couple the electronic device 1352 to external input and output devices. Examples of input and output devices include a display 1366 coupled to the video adapter 1364 and an I/O device 1370 such as a touch-screen coupled to the I/O interface 1368. Other devices may be coupled to the ED 1352, and additional or fewer interfaces may be utilized. For example, a serial interface such as Universal Serial Bus (USB) (not shown) may be used to provide an interface for an external device. Those skilled in the art will appreciate that in embodiments in which ED 1352 is part of a data center, I/O interface 1368 and Video Adapter 1364 may be virtualized and provided through network interface 1358.

In some embodiments, ED 1352 may be a standalone device, while in other embodiments, electronic device 1352 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a RedCap UE indicating or identifying unit/module, a comparing unit/module, a measuring unit/module, a capability exchanging unit/module, a RACH configuring unit/module, a broadcasting coverage recovering, a RACH performing unit/module, a received coverage recovering unit/module, and/or a coverage recovering unit/module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to the subject matter of the present disclosure, are hereby incorporated by reference in their entireties:

Ericsson, "Revised SID on Study on Support of Reduced Capability NR Devices", document RP-201677, 3GPP, July 2020;

TR38.875, v0.1.0 "Study on Support of Reduced Capability NR Devices" (Release 17), 2020-11-25;

TS 36.300, v16.3.0, "E-UTRA E-UTRAN Overall Description Stage-2";

TS 38.331, v16.2.0, "Radio Resource RRC protocol specification," (Release 16);

TS 36.331, V13.11.0, "Radio Resource RRC protocol specification," (Release 13), 2018-09-27;

TS 38.300, V 16.3.0, "NR and NG-RAN Overall description; Stage-2," (Release 16), 2020-10-02;

TS 36.213, V 13.11.0, "Evolved Universal Terrestrial Radio Access (E-UTRA); Physical layer procedures," (Release 13), 2018-10-01;

TS38.306, V 16-2, "User Equipment (UE) radio access capabilities," (Release 16), 2020-10-02.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method, comprising:

determining, by a user equipment (UE) based on a criterion, to indicate, to a base station, a combination of features the UE has during a random access (RA) procedure of the UE, wherein the combination of features comprises:

a first feature that the UE is a reduced capability (RedCap) UE, the RedCap UE having a bandwidth less than a minimum bandwidth of a non-RedCap UE, and a second feature being support of coverage enhancement, wherein the criterion for including the second feature in the combination is based on a measurement of a signal quality measured on receive branches of the RedCap UE, and wherein the determining comprises:

comparing, by the UE, a reference signal received power (RSRP) measurement with a threshold configured for RedCap UEs;

after the comparing:

when the UE has one receive branch and the RSRP measurement is greater than the threshold, determining, by the UE, to indicate the UE as the RedCap UE after the RA procedure;

when the UE has one receive branch and the RSRP measurement is less than or equal to the threshold, determining, by the UE, to indicate the UE as the RedCap UE during the RA procedure; or when the UE has two receive branches, determining, by the UE, to indicate the UE as the RedCap UE after the RA procedure; and sending, by the UE to the base station, one or more messages indicating the combination of the features according to a determination result of the determining.

2. The method of claim 1, wherein a number of the receive branches of the RedCap UE is one or two.

3. The method of claim 1, wherein a minimum number of receive branches for the non-RedCap UE is 4 for frequency range 1 (FR1) and is 2 for frequency range 2 (FR2).

4. The method of claim 1, the sending comprising:

sending, by the UE to the base station when determining to indicate during the RA procedure, a first message indicating the UE as the RedCap UE during the RA procedure, the first message including a message 1 (Msg1) of the RA procedure, a message 3 (Msg3) of the RA procedure, or a message A (MsgA) of the RA procedure.

5. The method of claim 4, further comprising:

determining, by the UE before the RA procedure, the first message based on a radio resource control (RRC) configuration indicating the criterion.

6. The method of claim 4, wherein the first message is a Msg3 including one or more bits for identifying the UE as the RedCap UE.

7. The method of claim 4, wherein the first message is a Msg1 or a MsgA that includes a physical random access channel (PRACH) preamble associated with the RedCap UE, the PRACH preamble being different from that of the non-RedCap UE.

8. The method of claim 4, wherein the first message is sent by the UE according to a PRACH configuration, the PRACH configuration indicating at least one of a RACH preamble or a RACH occasion associated with indicating the RedCap UEs.

9. The method of claim 4, further comprising:

receiving, by the UE from the base station during the RA procedure, a message 2 (Msg2) or a message 4 (Msg4) according to a received coverage recovery technique.

10. The method of claim 4, wherein the first message is the Msg1, the measurement of the signal quality comprises the RSRP measurement, and the method further comprises:

repeating, by the UE, a transmission of the Msg3 to the base station when the RSRP measurement is less than the threshold.

11. The method of claim 1, the sending comprising:

sending, by the UE to the base station when determining to indicate after the RA procedure, information of UE capability indicating the UE as the RedCap UE after the RA procedure is completed.

12. The method of claim 1, wherein the criterion is based on at least one of a number of receive branches of the UE, a reference signal received power (RSRP) measured by the UE, a reference signal received quality (RSRQ) measured by the UE, a reference signal strength indicator (RSSI) measured by the UE, or capability of the UE.

13. The method of claim 1, wherein the determining comprises:

when the UE has two receive branches, determining, by the UE, to indicate the UE as the RedCap UE after the RA procedure.

14. The method of claim 1, wherein the determining comprises:

when the UE has two receive branches and is operable in FR1 or FR2, determining, by the UE, to indicate the UE as the RedCap UE after the RA procedure;

when the UE has one receive branch and is operable in FR1 or FR2, determining, by the UE, to indicate the UE as the RedCap UE during the RA procedure; or when the UE has two receive branches and is operable in FR1, determining, by the UE, to indicate the UE as the RedCap UE during the RA procedure.

15. The method of claim 1, further comprising:

after the comparing:

when the UE has two receive branches and the RSRP measurement is greater than the threshold, determining, by the UE, to indicate the UE as the RedCap UE after the RA procedure;

when the UE has two receive branches and the RSRP measurement of the UE is less than or equal to the threshold, determining, by the UE, to indicate the UE as the RedCap UE during the RA procedure; or when the UE has one receive branch, determining, by the UE, to indicate the UE as the RedCap UE during the RA procedure.

16. An apparatus comprising:

a non-transitory memory storage storing instructions; and one or more processors in communication with the non-transitory memory storage, wherein the instructions, when executed by the one or more processors, cause the apparatus to perform operations including:

determining, based on a criterion, to indicate, to a base station, a combination of features the apparatus has during a random access (RA) procedure of the apparatus, wherein the combination of features comprises:

a first feature that the apparatus is or is part of a reduced capability (RedCap) UE, the RedCap UE having a bandwidth less than a minimum bandwidth of a non-RedCap UE, and a second feature being support of coverage enhancement, wherein the criterion for including the second feature in the combination is based on a measurement of a signal quality measured on receive branches of the RedCap UE, and wherein the determining comprises:

comparing, by the UE, a reference signal received power (RSRP) measurement with a threshold configured for RedCap UEs;

after the comparing:

when the UE has one receive branch and the RSRP measurement is greater than the threshold, determining, by the UE, to indicate the UE as the RedCap UE after the RA procedure;

when the UE has one receive branch and the RSRP measurement is less than or equal to the threshold, determining, by the UE, to indicate the UE as the RedCap UE during the RA procedure; or when the UE has two receive branches, determining, by the UE, to indicate the UE as the RedCap UE after the RA procedure; and sending, to the base station, one or more messages indicating the combination of the features according to a determination result of the determining.

17. The apparatus of claim 16, wherein a number of the receive branches of the RedCap UE is one or two.

18. An apparatus comprising:

a non-transitory memory storage storing instructions; and one or more processors in communication with the non-transitory memory storage, wherein the instructions, when executed by the one or more processors, cause the apparatus to perform operations including:

configuring a first random access channel (RACH) configuration for a reduced capability (RedCap) user equipment (UE) and a second RACH configuration for a non-RedCap UE, the first RACH configuration indicating RedCap identification information for identifying the RedCap UE during a random access (RA) procedure; and receiving one or more messages of the RA procedure that are sent by a first UE in accordance with the first RACH configuration, the one or more messages indicating a combination of features the UE has, wherein the combination of features comprises:

a first feature that the UE is the RedCap UE, the RedCap UE having a bandwidth less than a minimum bandwidth of the non-RedCap UE, and a second feature being support of coverage enhancement, wherein a criterion for including the second feature in the combination is based on a measurement of a signal quality measured on receive branches of the RedCap UE, wherein indication of the combination of features is based on comparing a reference signal received power (RSRP) measurement with a threshold configured for RedCap UEs, and wherein:

when the UE has one receive branch and the RSRP measurement is greater than the threshold, the indication indicates the UE as the RedCap UE after the RA procedure;

when the UE has one receive branch and the RSRP measurement is less than or equal to the threshold, the indication indicates the UE as the RedCap UE during the RA procedure; or when the UE has two receive branches, the indication indicates the UE as the RedCap UE after the RA procedure.

19. The apparatus of claim 18, wherein the one or more messages of the RA procedure comprise a message 3 (Msg3) including one or more bits for identifying the first UE as the RedCap UE, a message 1 (Msg1) or a message A (MsgA) that includes a physical random access channel (PRACH) preamble associated with the RedCap UE, the PRACH preamble being different from that of the non-RedCap UE.

* * * * *